US009373078B1

(12) United States Patent
Olsson et al.

(10) Patent No.: US 9,373,078 B1
(45) Date of Patent: Jun. 21, 2016

(54) METHODS AND SYSTEMS FOR PREDICTIVE ALERTING

(75) Inventors: Anders Olsson, San Diego, CA (US); Roman Jugai, San Diego, CA (US); Andreas Jonsson, San Diego, CA (US)

(73) Assignee: Anametrix, Inc., San Diego, CA (US)

( * ) Notice: Subject to any disclaimer, the term of this patent is extended or adjusted under 35 U.S.C. 154(b) by 460 days.

(21) Appl. No.: 13/453,926

(22) Filed: Apr. 23, 2012

Related U.S. Application Data

(60) Provisional application No. 61/477,993, filed on Apr. 21, 2011.

(51) Int. Cl.
*G06N 5/04* (2006.01)
*G06N 5/02* (2006.01)

(52) U.S. Cl.
CPC .. *G06N 5/02* (2013.01); *G06N 5/04* (2013.01); *G06N 5/048* (2013.01)

(58) Field of Classification Search
CPC ..................................... G06N 5/048
USPC ..................................... 706/46, 45
See application file for complete search history.

(56) References Cited

U.S. PATENT DOCUMENTS

| | | | |
|---|---|---|---|
| 6,446,123 B1 | 9/2002 | Ballantine et al. | |
| 6,901,428 B1 | 5/2005 | Frazier et al. | |
| 9,083,562 B2 | 7/2015 | Bates | |
| 2003/0050969 A1 | 3/2003 | Sant et al. | |
| 2003/0163479 A1 | 8/2003 | Mathews et al. | |
| 2003/0182359 A1 | 9/2003 | Vorchik et al. | |
| 2003/0226029 A1 | 12/2003 | Porter et al. | |
| 2004/0019788 A1 | 1/2004 | Miyazaki et al. | |
| 2005/0188016 A1 | 8/2005 | Vdaygiri et al. | |
| 2006/0212376 A1 | 9/2006 | Snyder et al. | |
| 2007/0047701 A1 | 3/2007 | Morris | |
| 2007/0112607 A1 | 5/2007 | Tien et al. | |
| 2007/0118570 A1 | 5/2007 | Wang | |
| 2007/0185830 A1 | 8/2007 | Rubel | |
| 2007/0277090 A1 | 11/2007 | Raja et al. | |
| 2008/0262908 A1 | 10/2008 | Broady et al. | |
| 2008/0263029 A1 | 10/2008 | Guha et al. | |
| 2008/0295074 A1 | 11/2008 | Schneider et al. | |

(Continued)

OTHER PUBLICATIONS

East African Community Secretariat, Enhancing Capacities of the Meteorological Services in Support of Sustainable Development in the East African Community Region Focusing on Data Processing and Forecasting Systems, EAC Report, 2008, pp. 1-286.*

(Continued)

*Primary Examiner* — Wilbert L Starks
(74) *Attorney, Agent, or Firm* — Banner & Witcoff, Ltd.

(57) ABSTRACT

Systems and methods to provide predictive alerting are disclosed. Trends and characteristics in the data may be identified in advance of actual occurrence, with an expected event being predicted or extrapolated based on data and a predictive model associated with stored and/or incoming data. This may be done by, for example, developing a set of rules associated with the model that may then be used to trigger predictive alerts based on predicted trends. Various data and associated characteristics may be determined based on past data and/or analogous data taken from similarly modeled systems. For example, seasonal trends may be factored into the model so that a prediction is based on both a received set of data and expected seasonal (or other temporal) trends. Various other characteristics may also be used in the predictive model.

33 Claims, 26 Drawing Sheets

Example Process for Executing an Alert

(56) References Cited

U.S. PATENT DOCUMENTS

| | | |
|---|---|---|
| 2008/0307189 A1 | 12/2008 | Mityagin et al. |
| 2009/0077014 A1 | 3/2009 | Zachariah |
| 2009/0132920 A1 | 5/2009 | Deyo et al. |
| 2009/0292681 A1 | 11/2009 | Wood et al. |
| 2010/0077048 A1 | 3/2010 | Czyzewicz et al. |
| 2010/0191702 A1 | 7/2010 | Hofmann |
| 2010/0274804 A1 | 10/2010 | Muskal et al. |
| 2011/0004622 A1 | 1/2011 | Marson |
| 2011/0060738 A1 | 3/2011 | Gates et al. |
| 2011/0107195 A1 | 5/2011 | Raja et al. |
| 2011/0119226 A1 | 5/2011 | Ruhl et al. |
| 2011/0185305 A1 | 7/2011 | Lai et al. |
| 2011/0246741 A1 | 10/2011 | Raymond et al. |
| 2012/0198369 A1 | 8/2012 | Sorin et al. |
| 2012/0239619 A9 | 9/2012 | Hersh et al. |
| 2012/0311462 A1 | 12/2012 | Devecka |
| 2013/0124461 A1 | 5/2013 | Dombrowski et al. |
| 2013/0133062 A1 | 5/2013 | Boss et al. |

OTHER PUBLICATIONS

The CEPIN Project, Text Alerts & 9-1-1: A Fact Sheet for People who are Deaf or Hard of Hearing, 2009, pp. 1-2.*

Johnson, et al., Seasonality in an Empirically Derived Markov Model of Tropical Pacific Sea Surface Temperature Anomalies, American Meteorological Society, 2000, pp. 3327-3335.*

Office Action in U.S. Appl. No. 13/396,362 dated Nov. 7, 2013 (8 pages).

Office Action in U.S. Appl. No. 13/396,362 dated May 22, 2014 (8 pages).

* cited by examiner

*Example System Configuration*

Example Plug-In Module Configuration

*Example API Configuration*

Example Server System Module Configuration

*Example Process for Generating an Alert*

*Example Alerting Menu Option Screenshot*

Example Alert Manager Window Screenshot

*Example Alert Configuration Screenshot*

Example Alert Configuration Screenshot – Metric Selection

Example Alert Configuration Screenshot – Metric Type Selection

Example Alert Configuration Screenshot – Temporal Configuration

Example Alert Configuration Screenshot – Prediction Configuration

Example Alert Configuration Screenshot – Confidence Configuration

*Example Alert Configuration Screenshot – Alert Messaging Configuration*

Example Alert Configuration Screenshot – Alert Messaging Configuration

*Example Alert Screenshot – Report with Added Alert*

*Example Alert Screenshot – Creating New Alert Specific to Table*

*Example Process/Thread for Checking for Alerts*

*Example Process/Thread for Executing Alerts*

*Example Process for Executing an Alert*

*Example Process for Generating Predictive Alerting Result*

*Example Process for Generating Predictive Alerting Result*

Example Process for Generating
Predictive Alerting Result

*Example Predictive Alarm Indication*

METHODS AND SYSTEMS FOR PREDICTIVE ALERTING

PRIORITY

This application claims priority under 35 U.S.C. 119(e) to U.S. provisional application No. 61/477,993 entitled "METHODS AND SYSTEMS FOR PREDICTIVE ALERTING," filed on Apr. 21, 2011, the content of which is hereby expressly incorporated by reference in its entirety for all purposes.

CROSS-REFERENCE TO RELATED APPLICATIONS

This application is related to U.S. patent application Ser. No. 13/396,362, entitled METHODS AND APPARATUS FOR INTERACTIVE DATA MANAGEMENT USING AN APPLICATION PLUG-IN, filed on Feb. 14, 2012 (referred to herein as the "Related Application"), which claims priority under 35 U.S.C. 119(e) to U.S. Provisional Patent Application Ser. No. 61/442,467, entitled METHODS AND APPARATUS FOR INTERACTIVE DATA MANAGEMENT USING AN APPLICATION PLUG-IN, filed on Feb. 14, 2011. The content of both these applications is incorporated by reference in its entirety for all purposes.

FIELD OF THE INVENTION

The present invention relates generally to networked data collection, processing, and visualization, including components for client use as well as server and database use. More particularly, but not exclusively, the invention relates to apparatus, methods, and computer media for receiving and storing data and information as well as configuring and providing predictive alerting based on the data and information.

BACKGROUND

Networked computer systems for collection, aggregation, and processing of data are known, and some systems allow acquisition and aggregation of data from multiple sources. In addition, some existing systems provide simplistic alerting capabilities based on received information. These systems, however, are very limited in their capability and typically provide only minimal capabilities, such as binary indication when a variable exceeds a predefined value.

Existing systems do not take into account more detailed information included in the information, such as interrelationships, trends, or other factors.

SUMMARY

Exemplary aspects of the invention that are shown in the drawings are summarized below. These and other aspects are more fully described in the Detailed Description section. It is to be understood, however, that there is no intention to limit the invention to the forms described in this Summary or in the Detailed Description. One skilled in the art can recognize that there are numerous modifications, equivalents and alternative constructions that fall within the spirit and scope of the invention as expressed in the claims.

In one aspect, the present disclosure relates to a method of providing predictive alerting. The method includes determining, at a server system, one or more predictive models associated with the one or more variables, the one or more predictive models being determined based at least in part on previous data associated with the one or more variables. The method further includes receiving additional data associated with the one or more variables. An alert indicative of a predicted future state of the one or more variables is then provided based upon this additional data and the one or more predictive models.

In another aspect, the present disclosure provides an alternate method of providing predictive alerting. The method includes receiving first data associated with one or more variables and analyzing the first data to identify a seasonality pattern associated with the one or more variables. The method further includes determining, at a server system, one or more predictive models associated with the one or more variables, where the one or more predictive models are determined based at least partially on the identified seasonality pattern. The method further includes receiving second data associated with the one or more variables, and generating, based on the received second data and the one or more predictive models, an alert indicative of a predicted future state of the one or more variables.

In a further aspect, the disclosure pertains to a processor-readable medium comprising instructions for causing a processor to store, at a server system, one or more predictive models associated with one or more variables, the one or more predictive models being determined based at least in part on previous data associated with the one or more variables. The instructions further cause the processor to receive additional data associated with the one or more variables. The instructions also cause the processor to provide, based on the additional data and the one or more predictive models, an alert indicative of a predicted future state of the one or more variables.

In another aspect, the present disclosure provides a processor-readable medium including instructions for causing a processor to receive first data associated with one or more variables and analyze the first data to identify a seasonality pattern associated with the one or more variables. The instructions further cause the processor to store, at a server system, one or more predictive models associated with one or more variables, the one or more predictive models being determined based at least partially on the identified seasonality pattern, receive second data associated with the one or more variables, and generate, based on the received second data and the one or more predictive models, an alert indicative of a predicted future state of the one or more variables.

In an additional aspect, the disclosure relates to a server system including a processor and a memory coupled to the processor. The memory contains instructions which, when executed by the processor, cause the processor to store one or more predictive models associated with one or more variables, the one or more predictive models being determined based at least in part on previous data associated with the at least one or more variables. The instructions further cause the processor to receive additional data associated with the one or more variables and generate, based on the additional data and the one or more predictive models, an alert indicative of a predicted future state of the one or more variables.

In yet another aspect, the present disclosure provides a server system. The server system includes a processor and a memory coupled to the processor. The memory contains instructions for execution on the processor to receive first data associated with one or more variables, analyze the first data to identify a seasonality pattern associated with the one or more variables, store, at a server system, one or more predictive models associated with one or more variables, the one or more predictive models being determined based at least partially on the identified seasonality pattern, receive second data associated with the one or more variables, and generate, based on the received second data and the one or more predictive models, an alert indicative of a predicted future state of the one or more variables.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

Various objects and advantages and a more complete understanding of the invention are apparent and more readily appreciated by reference to the following Detailed Description and to the appended claims when taken in conjunction with the accompanying Drawings wherein:

DETAILED DESCRIPTION

Figure 1:
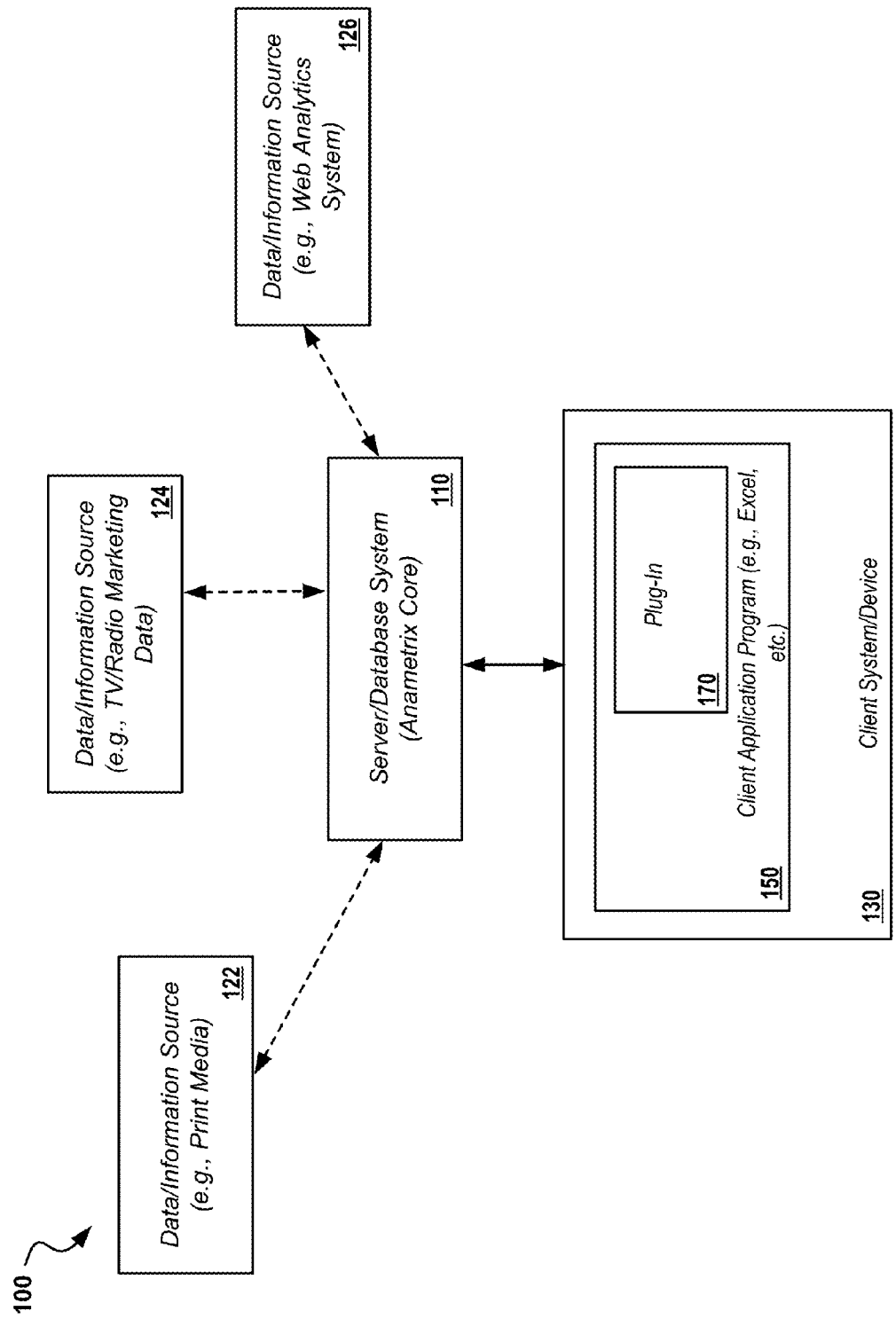
FIG. 1 illustrates details of an exemplary system in accordance with the disclosure.

Systems and methods in accordance with the disclosure relate generally to the field of data collection, processing, and visualization that is accomplished though a host or server system and computer network (such as the Internet, but internal corporate networks may also be used in various implementations) in conjunction with one or more client computer systems.

In an exemplary embodiment, a server system acquires data from various sources such as online web site visitor behavior (such as web analytics), offline data sources, $3^{rd}$ party APIs, etc. Various mechanisms for providing such data, such as via a client application on a local computer system, are described in the Related Application, along with ways for efficiently providing information to a host or server system.

Embodiments of systems and methods in accordance with the disclosure may be used to configure and provide alerting capabilities in conjunction with such a system, such as is further described below.

As used herein, the term "alerting" relates to mechanisms for informing or notifying customers (e.g., users of a host server system configured such as described in herein and/or in the Related Application) when certain events or conditions have been met. These may be based on one or more metrics that may be configured by a user such as described further below. For example, in one implementation, a customer, such as a business having a website and interesting in tracking hits to the website, may be interested in determining the number of visitors and receiving advanced notification when the number of visitors reaches a particular level or satisfies some other functional relationship. This may be done by applying predictive processing to received and/or stored data that may be used to generate a prediction as to when a particular event or condition will occur. In some implementations, multiple variables and/or functions of those variables may be combined in the prediction, such as, for example, adjusting predictions for seasonality or other variations, adjusting based on past characteristics or characteristics of similar or analogous processes, or based on other factors such as are further described below.

To provide predictive alerting, trends and characteristics in the data may be identified in advance of actual occurrence, with an expected event being predicted or extrapolated based on data and a predictive model associated with stored and/or incoming data. This may be done by, for example, developing a set of rules associated with the model that may then be used to trigger predictive alerts based on predicted trends. By carefully generating the model, a small sample of data may be used as an input to generate the predictive results (and associated alerts). Various data and associated characteristics may be determined based on past data and/or analogous data taken from similarly modeled systems. For example, seasonal trends may be factored into the model so that a prediction is based on both a received set of data and expected seasonal (or other temporal) trends. Various other characteristics may also be used in the predictive model. For example, particular events may be considered, which may be periodical or temporally known. Alternately, or in addition, events of unknown occurrence (e.g., natural disasters, war, economic impacts, etc.) may have data and models associated with them that may be used to generate the predictive model.

Based on a predictive model and received data, an alert may be sent to a customer in various ways as further described below. For example, a user may be able to configure a particular alert type and indication mechanism (e.g., phone, FAX, instant messaging "IM", email, etc.) as well as other parameters such as confidence or reliability of the prediction, frequency of alerting, and the like.

Before further describing various aspects of alerting functionality, it may be helpful to describe the general context and systems in which embodiments may be implemented. For example, FIG. 1 illustrates details of a system 100. System 100 includes one or more (typically many) Client Systems or Devices 130, as well as a host Server/Database System 110. Server system 110 will generally include one or more databases or other data storage devices as well as associated hardware, software, peripheral interface devices, and the like, including modules to receive and store data, store predictive configuration information, generate predictions, and provide alerts or other data or information to client systems.

The data and information stored on server system 110 may be data associated with multiple clients, and each client's data may be further subdivided into data associated with campaigns, such as advertising campaigns, web metrics, sales data, and/or other types of data or information. Data may be provided to server system 110 from a variety of sources, some of which are shown as sources 122, 124, and 126 in FIG. 1. In particular, data source 122 may be data or information from print media sources, such as newspapers, magazines, or other print publications. This may be information such as, for example, sales data, subscriber data, advertising metrics, website view or hits, and/or other data or information. Similarly, data from other sources such as TV/Radio advertising and marketing source 124, web analytics information system 126, and/or data or information from other sources (not shown) may also be integrated with server system 110.

At client system 130, a client application program 150, such as, for example, a spreadsheet application like Microsoft Excel™ (or other standardized or customized client application) may be loaded and running. A user of client system 130 may desire to retrieve information from server system 110, such as, for example, a user desiring to see the results of a particular advertising campaign, the number of webhits at multiple websites, inventory information, sales information, and or other information. In addition, the user may desire to receive predictive alerts associated with the campaigns.

Information from multiple sources, such as sources 122, 124, and 126 (and/or others not shown in FIG. 1) may be aggregated in server system 110. A standalone application program or programs 150, and/or a plug-in module 170, which may be integrated with the application program 150, may be configured as described in the Related Application to facilitate download of information from server system 110, display and analysis of the information, editing and adding data to the information, and uploading and merging any changes or additions of data to server system 110. In addition, data and information may be provided to server system 110 from any of the other sources shown in FIG. 1, and/or other sources (not shown). The aggregated data may be used, in whole or part, to generate predictions and associated alerts as further described subsequently herein.

Figure 2:
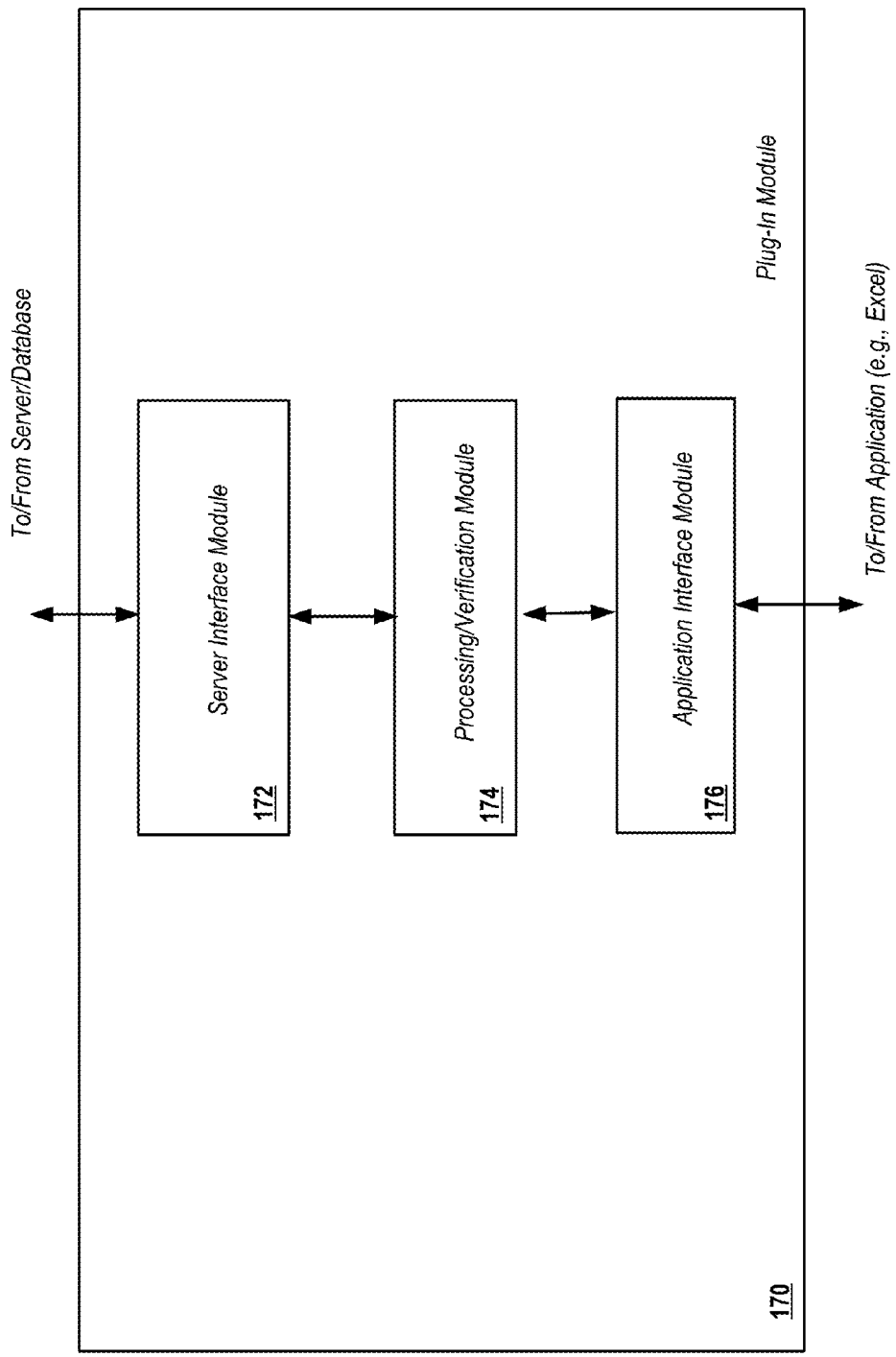
FIG. 2 illustrates details of an exemplary plug-in module for use in conjunction with an application program.

Turning to FIG. 2, an example configuration of a plug-in module 170 for facilitating data transfer and/or alerting information, such as shown in FIG. 1 is illustrated. Alerting information may also be provided separately via various other media such as text or voice messages, emails, IMs, audible or visual alarms, web pages, or via other mechanisms.

Plug-in module 170 may include a server interface module 172, which may be configured to integrate with the application program 150 and/or other programs, such as operating systems, drivers, etc. in the client system 130 so as to transfer data to and from the server system 110. In addition, plug-in module 170 may include a processing/verification module 174 configured to perform functions such as processing data stored in or transferred to or from the application program 150, verifying data being transferred to the server system 110, and/or performing other functions described herein. An application interface module 176 may be included, with the application interface module 176 configured to interface, such as through an Application Programming Interface (API) with the application program 150, to transfer data to or from the application program, facilitate displaying data, and/or provide other application interface functions.

Figure 3:
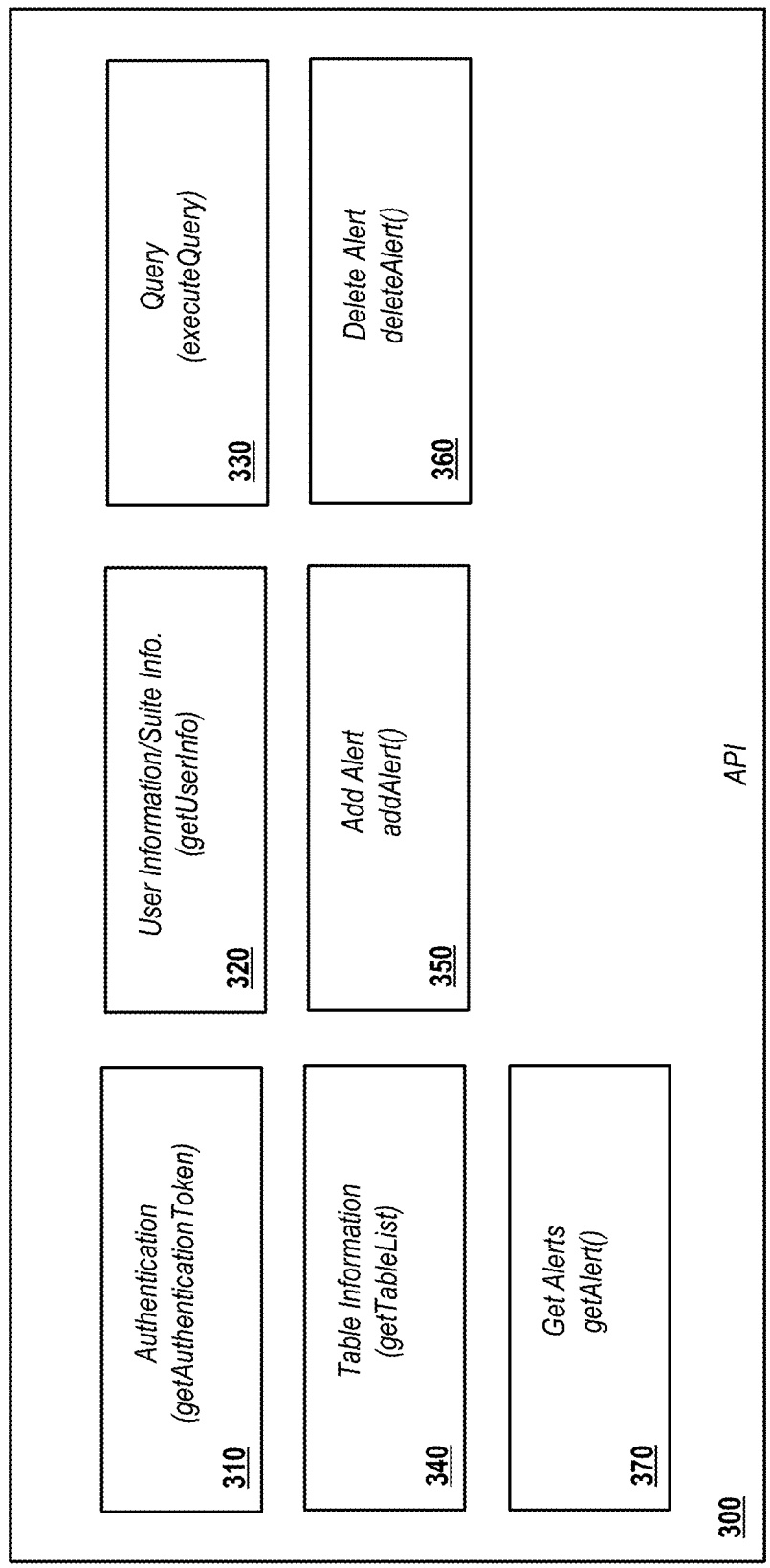
FIG. 3 illustrates details of an embodiment of an exemplary Application Programming Interface (API) for use in conjunction with an application program.

FIG. 3 illustrates details of an embodiment of an API 300 that may be used in conjunction with elements of a system such as system 100 in order to facilitate communication and processing between client systems, such as client system 130, and server systems, such as server system 110. Functions may include extraction, data uploading, data downloading, alerting, management, and/or other functions such as described herein.

In an exemplary implementation, API functions may include one or more of the following:

A getAuthenticationToken function 310 authenticates to the API by passing a valid username/password combination. The rest of the API calls may assume that the session has been initiated by an authentication call. A getUserInfo function 320 gets a list of accessible data suites/accounts and other related information. An executeQuery function 330 downloads data from the server system (e.g., Anametrix servers). A getTableList function 340 downloads a list of tables associated with the specified data suite/account. An addAlert function 350 and/or deleteAlert function 360 may be included to add or remove alerts, such as described subsequently herein. In addition, a getAlert function 370 may be included to facilitate receiving alerts.

A typical API session may include a series of sequential executions of commands such as the following:
  authentication (getAuthenticationToken),
  get a list of available data suites/accounts (getUserInfo).
  [user selects a data suite].
  Get a list of tables for the selected data suite (getTableList).
  [User selects a table]
  [user adds alert for the table]

Figure 4:
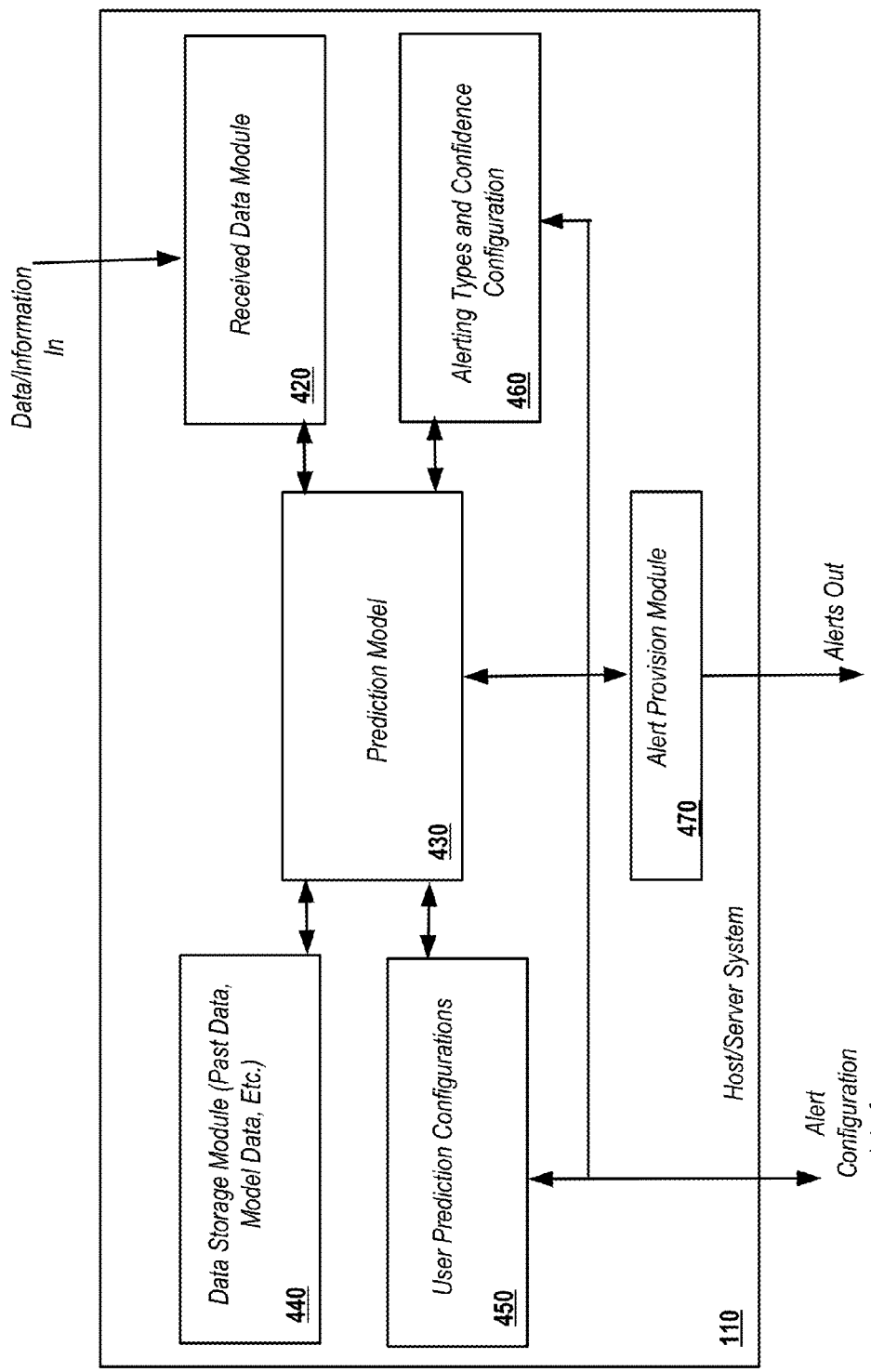
FIG. 4 illustrates details of details of an exemplary server system in accordance with the disclosure.

FIG. 4 illustrates details of an example embodiment of a server system such as server system 110 of FIG. 1. The various modules shown in FIG. 4 may be implemented in hardware, software, firmware, and/or combinations of these. Data may be stored in memory spaces of various types known or developed in the art, and processing may be done based on instructions stored on a computer readable medium, which may be part of or stored in memory. One or more processors or other processing devices may be used to perform the processing functions associated with the modules of FIG. 4, including determining predictive results based on models and providing alerts based on the predictions.

Server system 110 may include, for example, a received data module 420 configured to receive data from one or more sources, such as sources 122, 124 and 126 shown in FIG. 1, and store and provide the data to prediction module 430.

Prediction module 430 may be configured to generate a prediction based on received data and/or other stored data or model information in data storage module 440, with the prediction based on data or other configuration information stored in user prediction configurations module 450 and/or alerting types and confidence configuration module 460. An alert provision module 470, which may be configured to send alerts via text message, email, voicemail, and/or other alerting mechanisms, may be coupled to prediction model 430 to send alerts. A user may configure alerting parameters and conditions in conjunction with the user prediction configurations module 450 and the confidence configuration module 460, such as further described subsequently herein.

Figure 5:
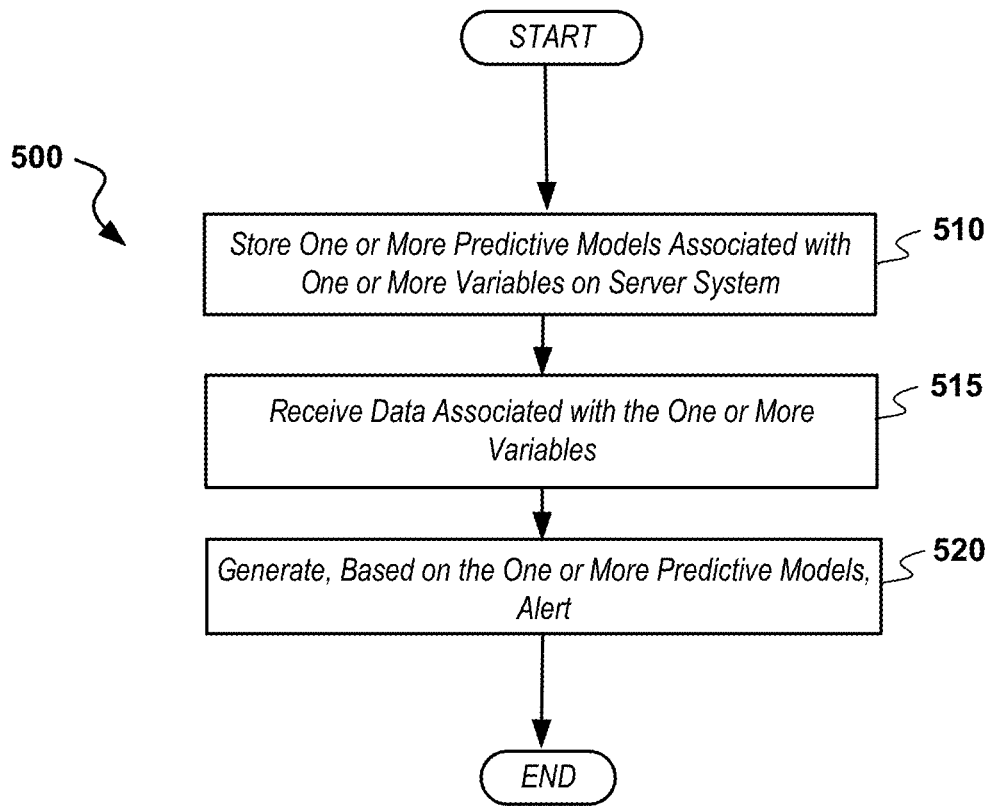
FIG. 5 illustrates an exemplary workflow for transferring data between a client system and a server system such as shown in FIG. 1.

FIG. 5 illustrates an embodiment of an example process 500 for providing predictive alerting. At stage 510, one or more predictive models associated with one or more variables may be stored at a server system, such as server system 110 as shown in FIGS. 1 and 4. At stage 520, data associated with the one or more variables may be received. At stage 530, based on one or more predictive models, an alert may be generated.

The process 500 may further include, for example, providing the alert to a user using one or more signaling mechanisms. For example, the alert may be provided as an email message. Alternately, or in addition, the alert may be provided as a text or voice message. Alternately, or in addition, the alert may be provided on a website.

The predictive model may be based, for example, at least in part on a temporal variation in the one or more variables. The temporal variation may be a seasonal variation. Alternately, or in addition, the predictive model may be based at least in part on an event associated with the one or more variables.

The process 500 may further include, for example, providing a display to configure parameters associated with the alert. The parameters may relate to a temporal configuration associated with the alert. The parameters may relate to a prediction configuration associated with the alert. The parameters may relate to a confidence configuration associated with the alert.

The prediction model may be generated, for example, based in part on previous data associated with the variable. The prediction model may be generated in part based on data that is analogous to data associated with the variable. The alert may be generated based on a plurality of predictive models.

Figure 6:
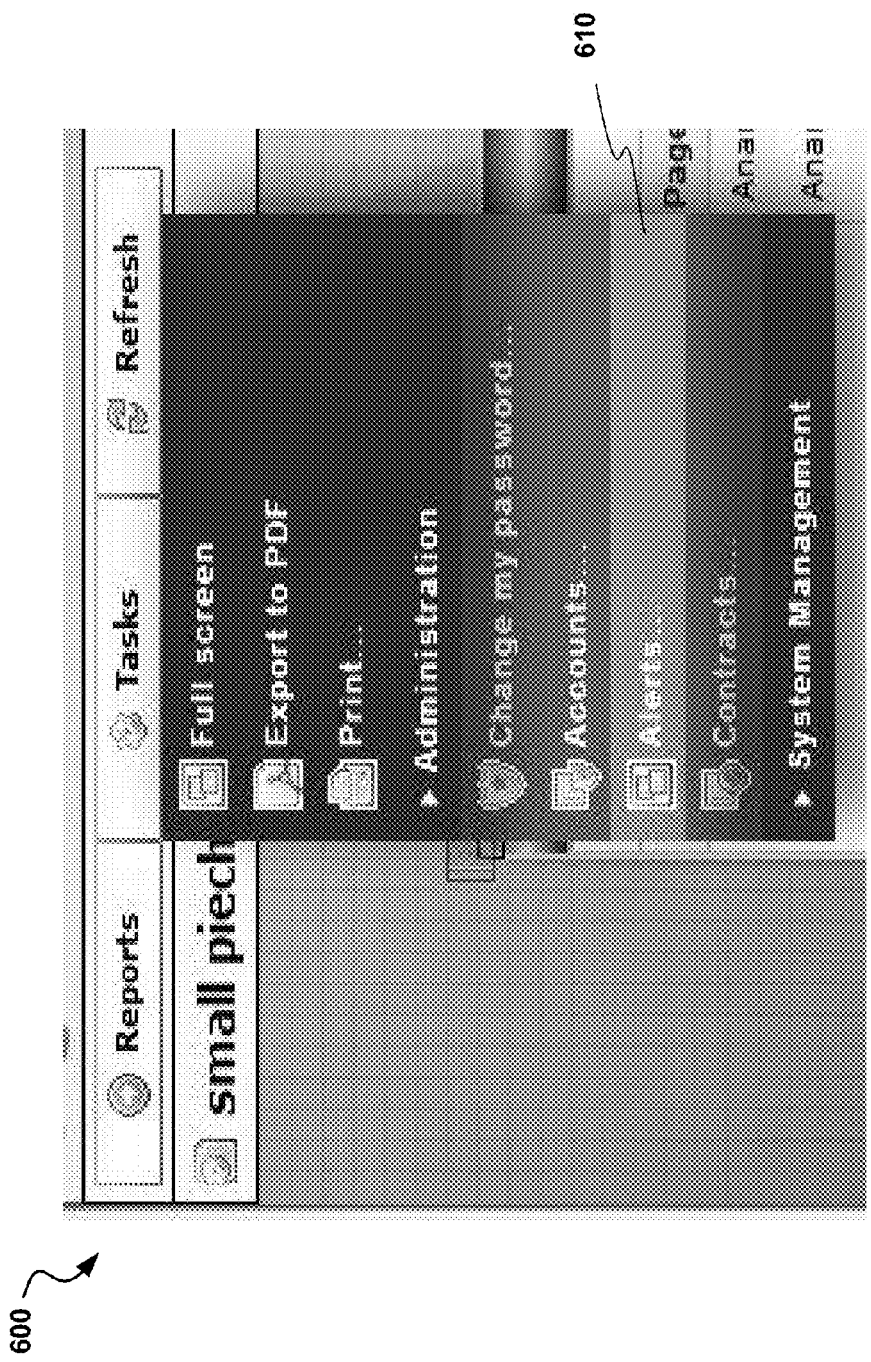
FIG. 6 illustrates a screenshot of aspects related to configuration predictive alerts in accordance with the disclosure.

FIG. 6 illustrates details of an example screenshot 600 of an alerting function as shown in a server system application provided by Anametrix, Inc. Screenshot 600 illustrates details of certain functional elements of a larger application for receiving, managing, presenting, analyzing, processing, and alerting users based on data and/or other information. Further details of such a system are described in the Related Application. In this implementation, an "Alerts" menu option 610 may be provided to allow a user to create and configure predictive alerting functions such as described subsequently.

Figure 7:
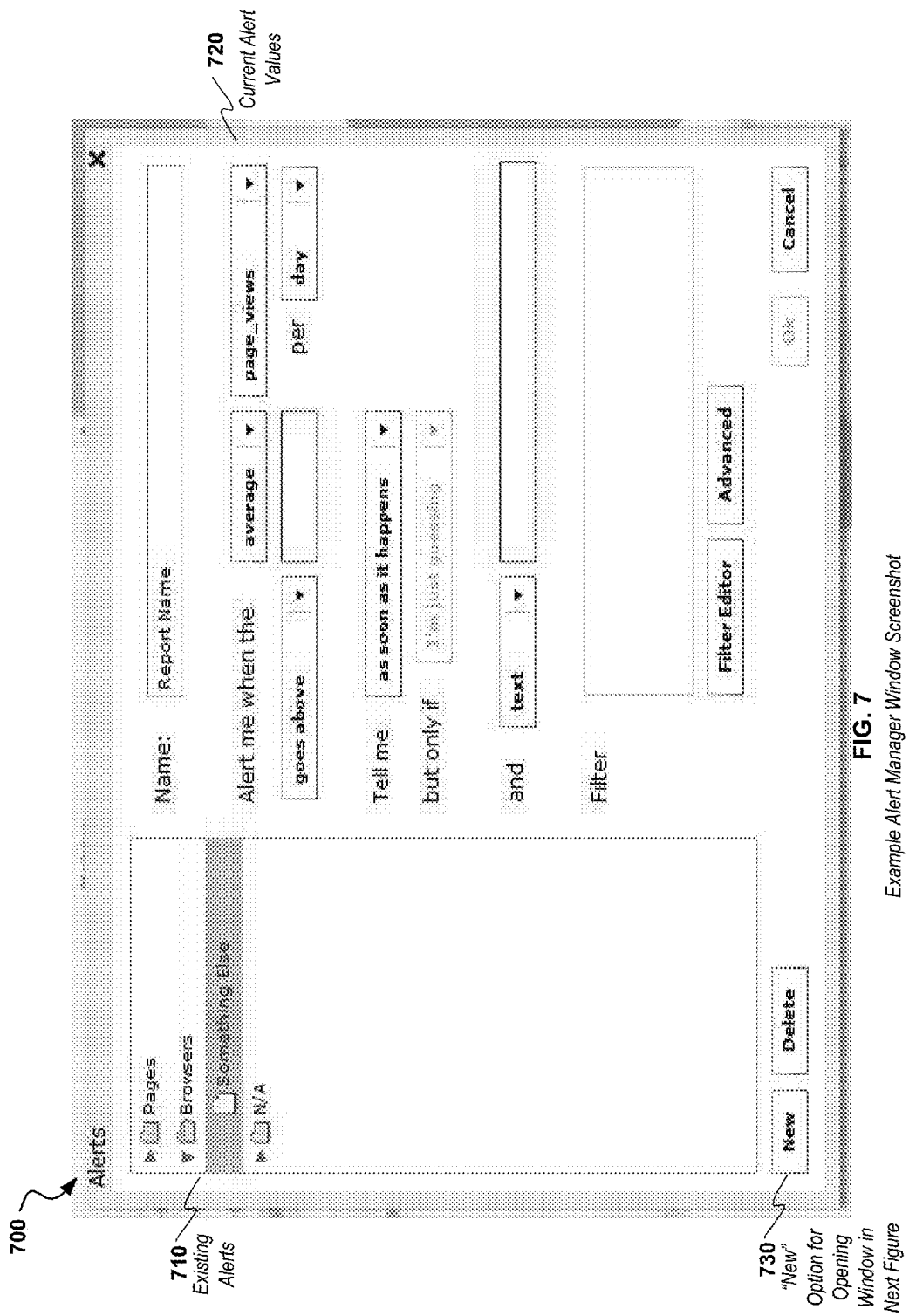
FIG. 7 illustrates a screenshot of aspects related to configuring alerts in accordance with the disclosure.

FIG. 7 illustrates details of an exemplary screenshot 700 of an alert management window for creating and configuring alerting. Existing alerts, as may have been previously user-defined or defined by default, are shown in box 710 in a tree configuration. Panel 720 on the right of screen 700 shows various configurable alert parameters that are described in further detail subsequently. In this example configuration, a new alert may be created by selecting the "New" option in box 730.

Figure 8:
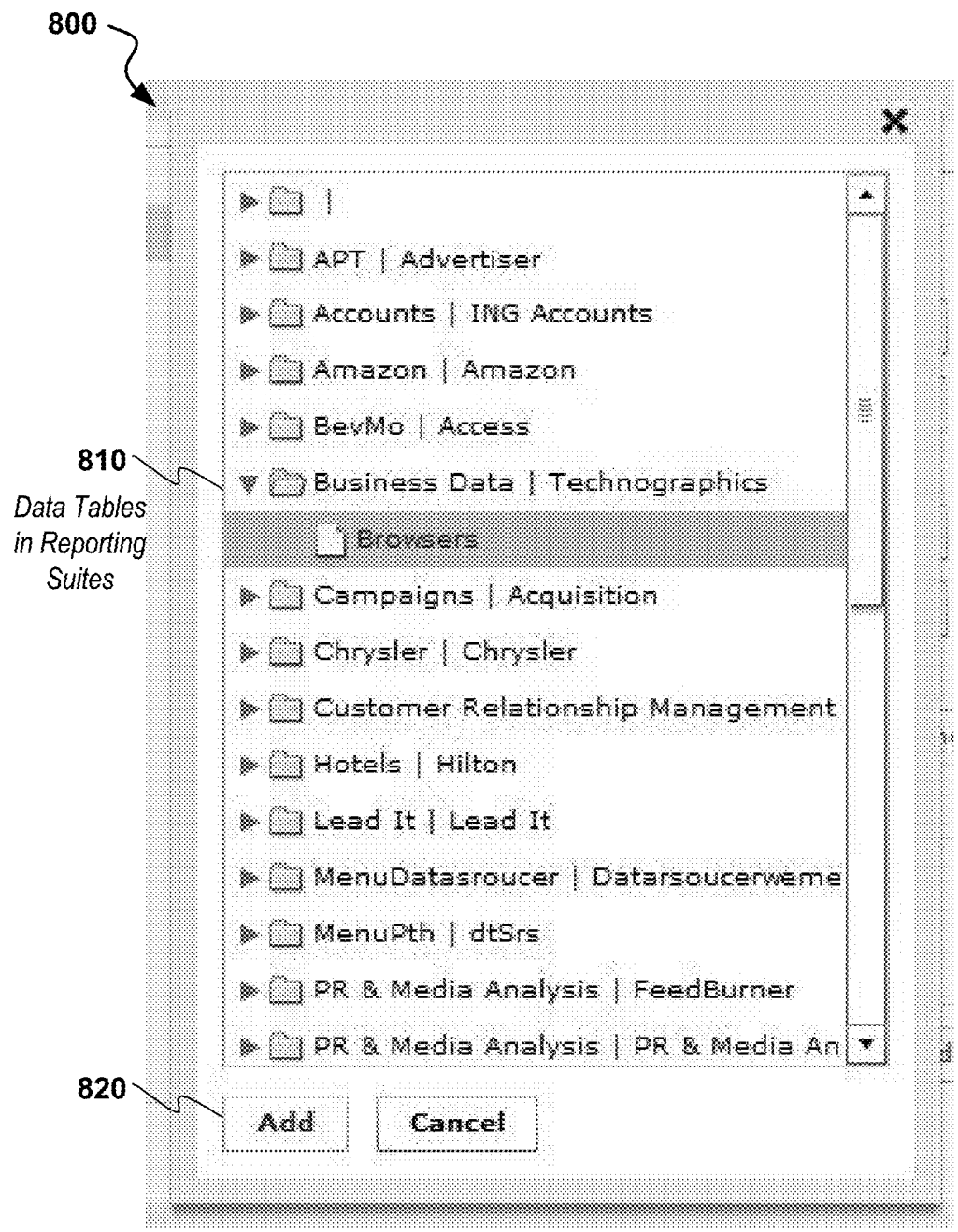
FIG. 8 illustrates a screenshot of aspects related to creating new alerts in accordance with the disclosure.

FIG. 8 illustrates details of an exemplary screenshot 800 of an alert configuration menu that may be opened in response to selection of the "New" option in box 730 of FIG. 7. The tree display of screen 800 illustrates current data tables 810 in current reporting suites. A user may select a table (e.g., Business Data/Technographics/Browsers in the example shown) and select the "Add" button 820 to create a new alert associated with the selected table (e.g., Browsers table).

Figure 9:
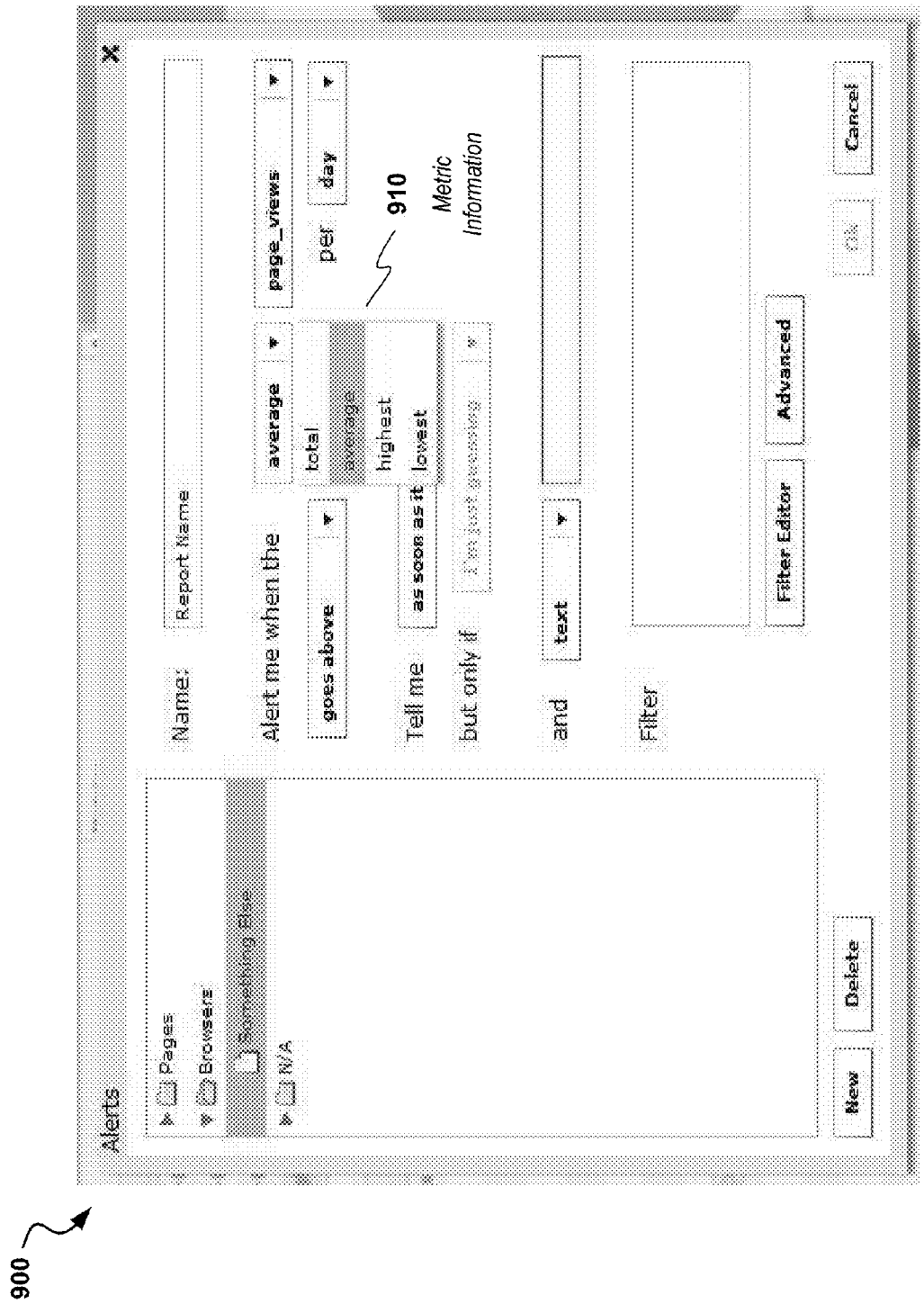
FIG. 9 illustrates a screenshot of aspects related to selecting alerting metrics in accordance with the disclosure.

FIG. 9 illustrates additional details of an exemplary screenshot 900 and associated functions. Once an alert is configured or newly created, a user may be provided with various options for configuring an alert. Box 910 illustrates some example configuration options —in this case, a user may select to be alerted when a parameter, based either on actual or predicted value, is in a particular relationship. For example, the parameter may be selected to be above, at, or below an actual or predicted value. The actual or predicted value may be, for example, an average value, a peak or highest value, a relative peak (e.g., within a time frame, data range, etc.), a minimum or low value, a relative low, and/or in another functional relationship as may be selected by a user. In the example shown, a user may select a total value, an average value, a highest value, or a lowest value, however, other values may be also be provided for and selected in various implementations. In some implementations a user may be provided with an additional interface to define the value, such as through an equation or other functionally defined relationship.

Figure 10:
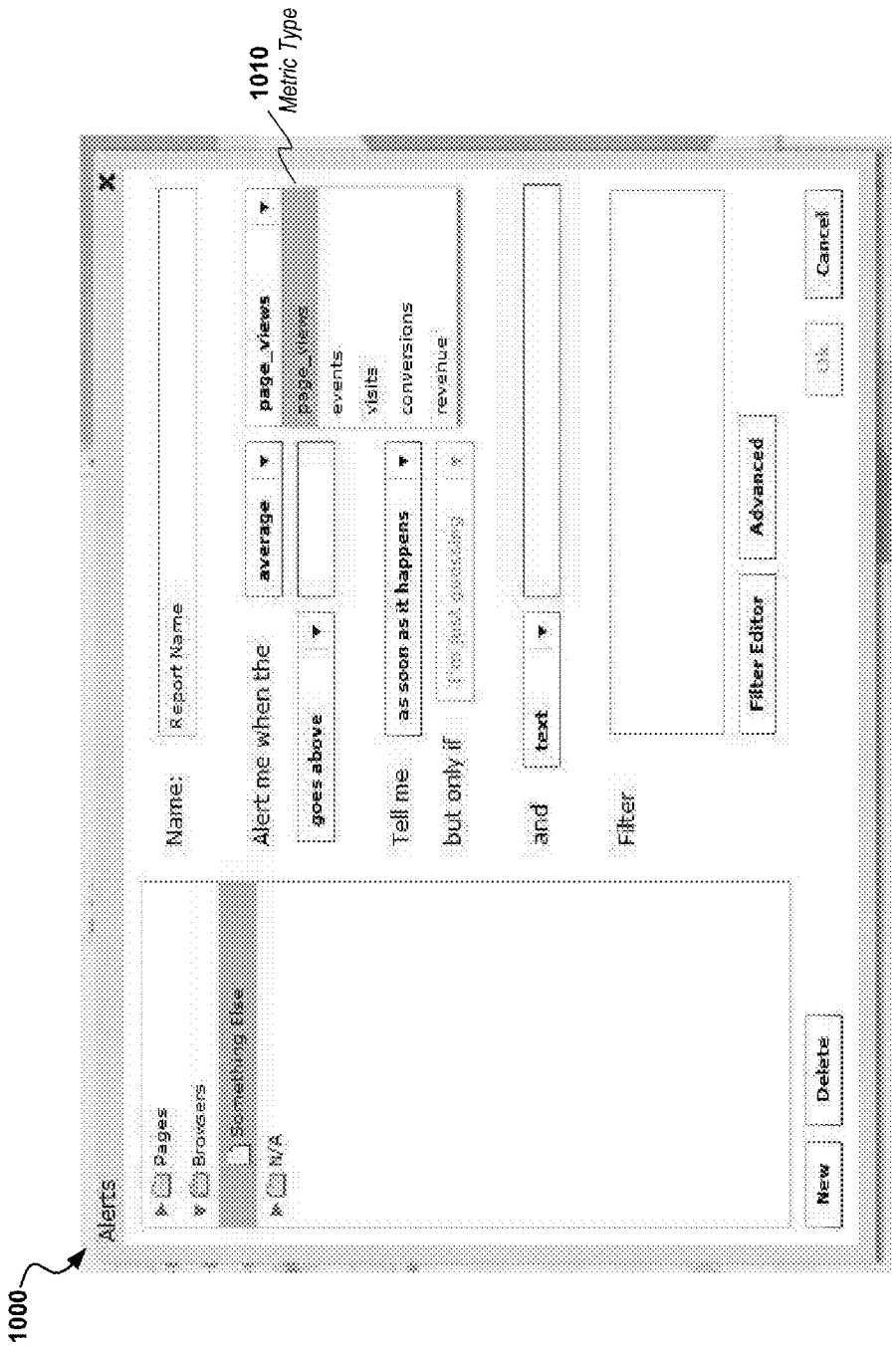
FIG. 10 illustrates a screenshot of aspects related to selecting metric types in accordance with the disclosure.

FIG. 10 illustrates additional details of an exemplary screenshot 1000 and associated functions. At box 1010, a metric type may be selected. For example, types may be number of page views (page_views), events, visits, conversions, revenue, and/or other types (not shown). The metric type configuration box 1010 may be configured to allow a user to select a type from multiple possible types and provide alerting consistent with other selected options as shown on screen 700. The available types may be based on a particular table (of table sets 810) as shown in FIG. 8.

Figure 11:
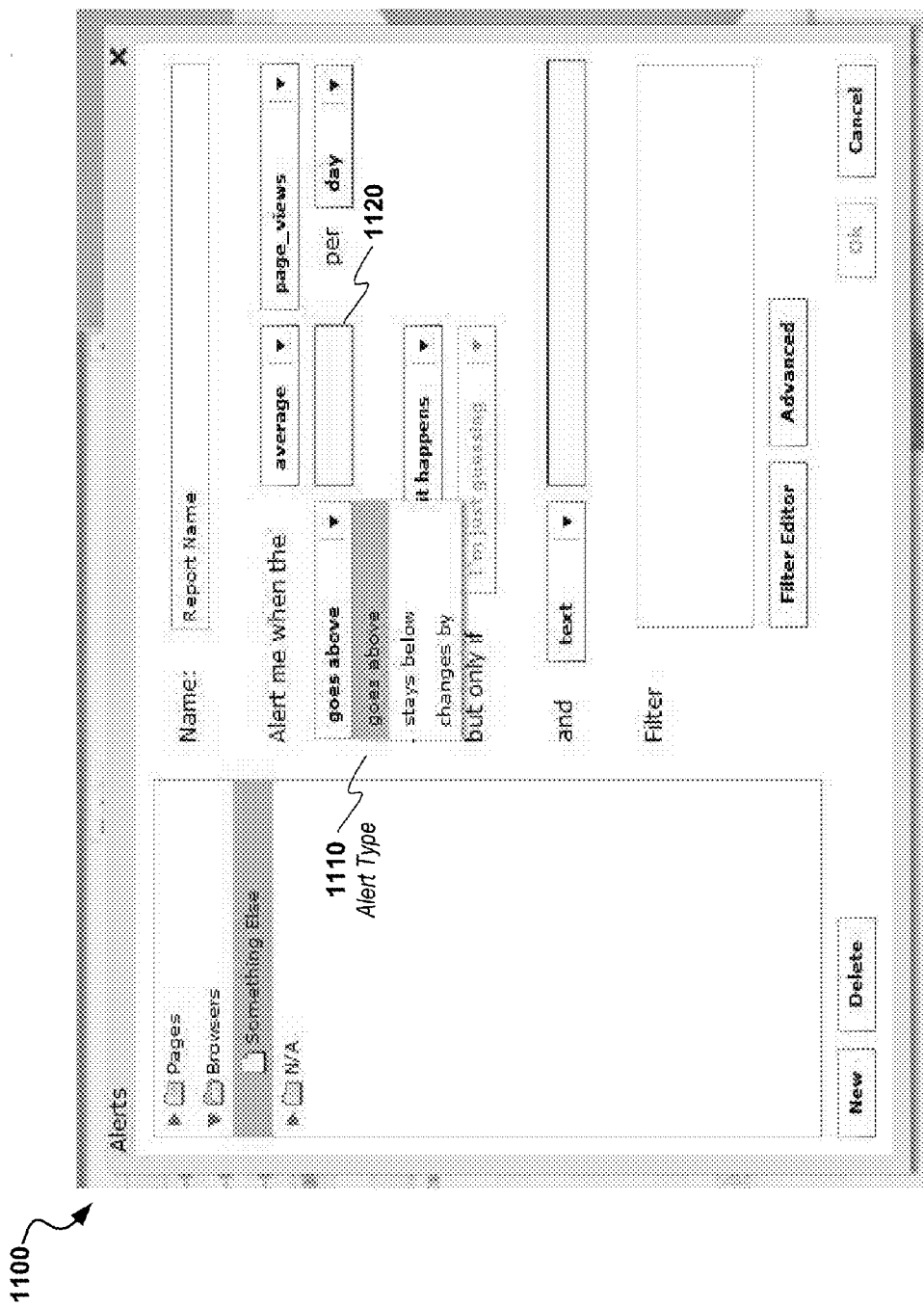
FIG. 11 illustrates a screenshot of aspects related to selecting alert types in accordance with the disclosure.

FIG. 11 illustrates additional details of an exemplary screenshot 1100 and associated functions. At box 1110, an alert type may be selected. For example, the selected alert type may be based on a relationship between a variable or parameter and a defined threshold or other defined functional relationship. Based on previously selected variables or parameters (e.g., such as number of web hits, sales volumes, number of product users, etc.) selected for monitoring, the predictive processing may be configured to alert if the parameter goes above a certain value or range of values (or, alternately, remains within a particular range of values), stays below a value or range of values, changes by an amount or a percentage or other functionally defined relationship, or otherwise takes on values above, below, or within a predefined value or range of values. In the example shown, an alert may be provided to a user, such as by email, when a variable, such as a number of web hits at a website associated with a table such as shown in FIG. 8, goes above a selected value. The selected value may be defined in conjunction with temporal parameters, such as number of hits per day, per week, per hours, etc. This may be further adjusted for seasonality or other factors. A numerical value or functional relationship may be added in box 1120.

Figure 12:
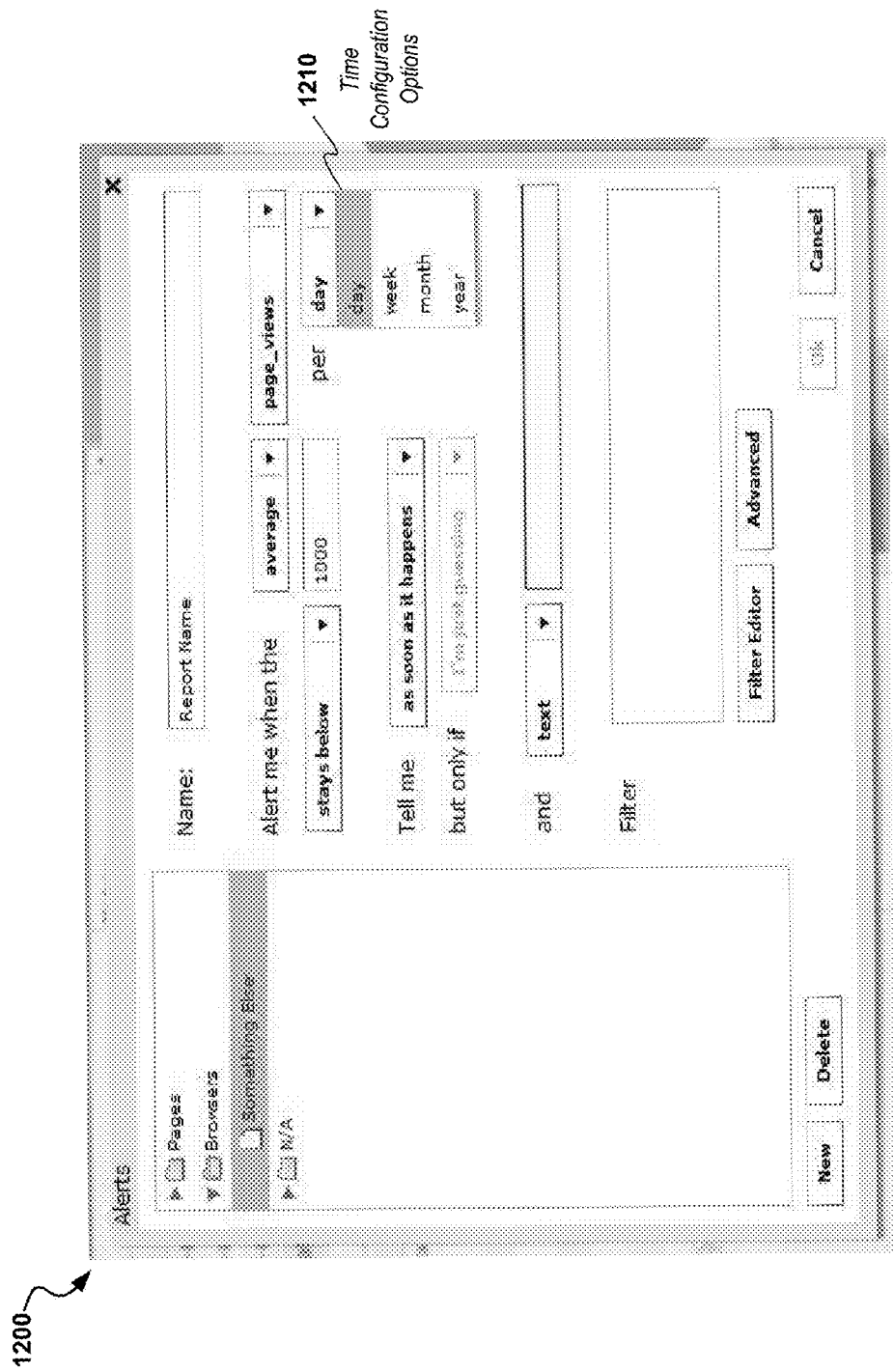
FIG. 12 illustrates a screenshot of aspects related to temporal configuration in accordance with the disclosure.

FIG. 12 illustrates additional details of an exemplary screenshot 1200 and associated functions. At box 1210, additional temporal or analogous information may be added to further constrain the alert processing. For example, a time frame for prediction and time monitoring may be defined, such as daily, weekly, monthly, yearly, etc. The temporal information may be further adjusted or constrained by factors such as seasonal or event variations and/or other functional relationships.

Figure 13:
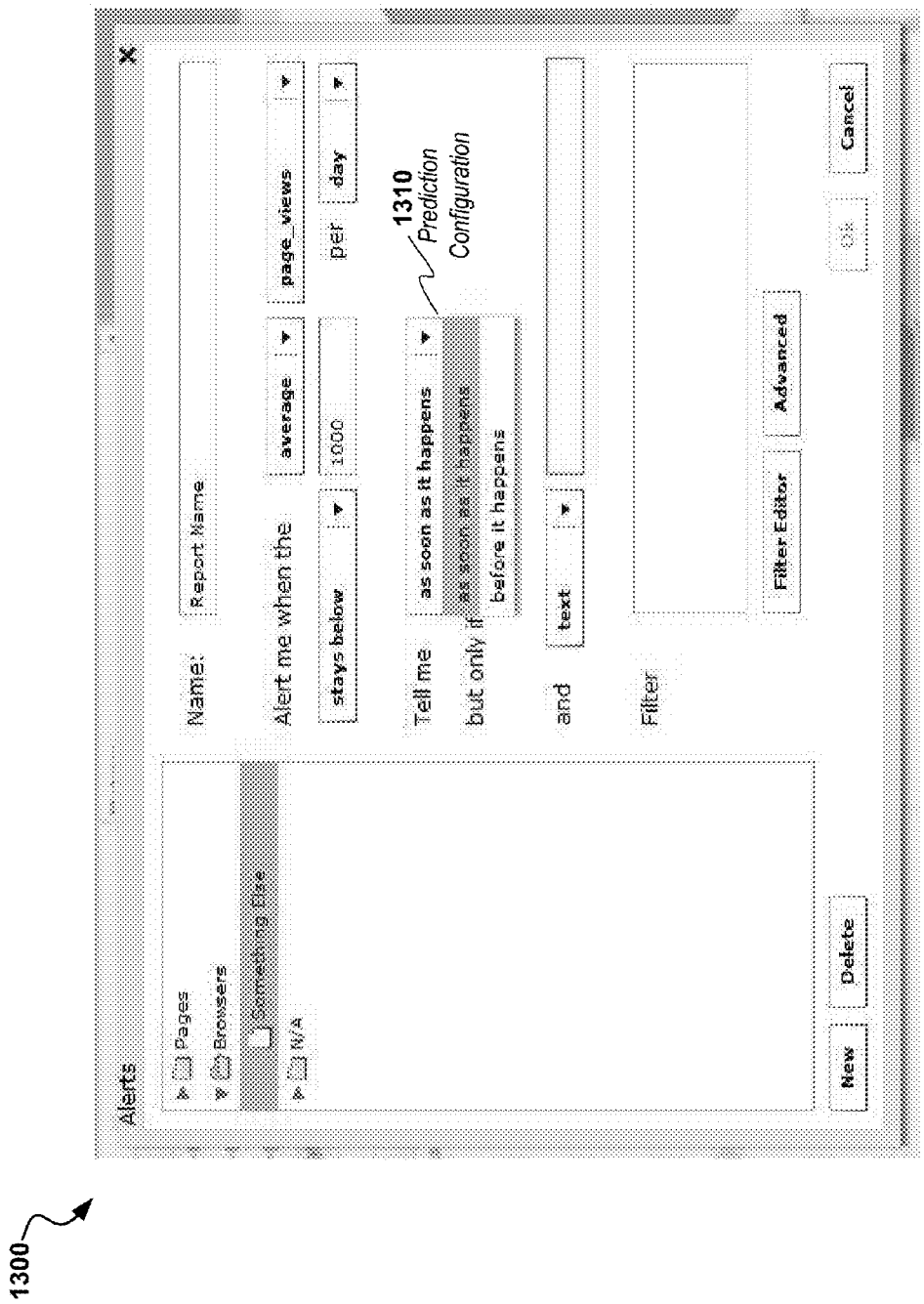
FIG. 13 illustrates a screenshot of aspects related to prediction configuration in accordance with the disclosure.

FIG. 13 illustrates additional details of an exemplary screenshot 1300 and associated functions related to prediction configurations. Box 1310 may be included to allow a user to select prediction configurations, such as whether and when predictive alerts are to be provided. In some cases, a user may merely wish to receive an alert when a predefined event occurs or a condition is met; however, in many cases a user may wish to receive predictive alerts in advance of occurrence of the event or condition.

Figure 14:
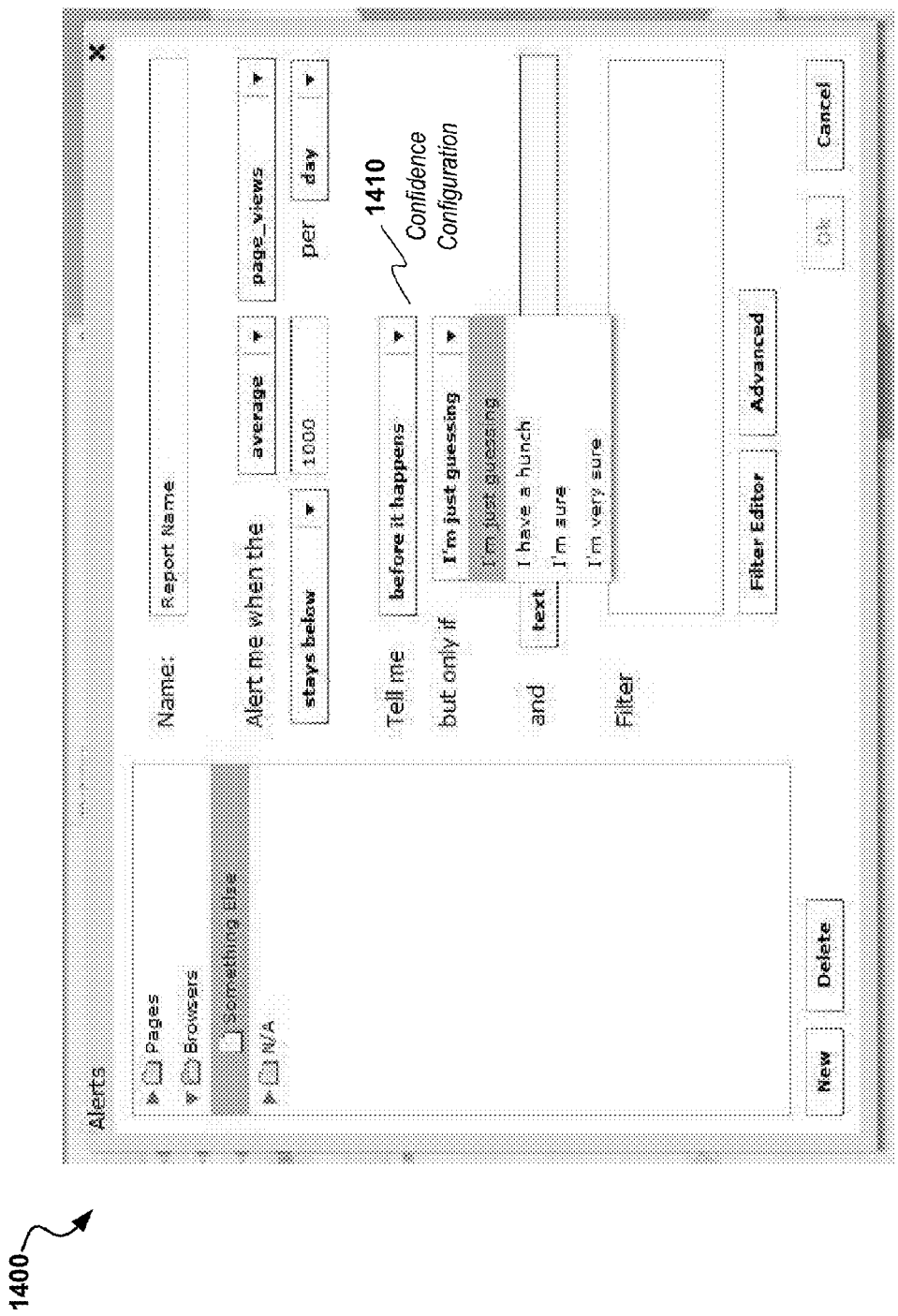
FIG. 14 illustrates a screenshot of aspects related to confidence configuration in accordance with the disclosure.

FIG. 14 illustrates additional details of an exemplary screenshot 1400 and associated functions to configure a confidence level associated with the prediction. Assuming a predictive alert has been selected (such as shown in FIG. 13), box 1410 may be used to specify a confidence level associated with the provided predictive alerts. For example, configurations may be based on degree of reliability of the prediction (which may be based on, for example, known or developed statistical metrics), as well as other confidence or related criteria.

Figure 15:
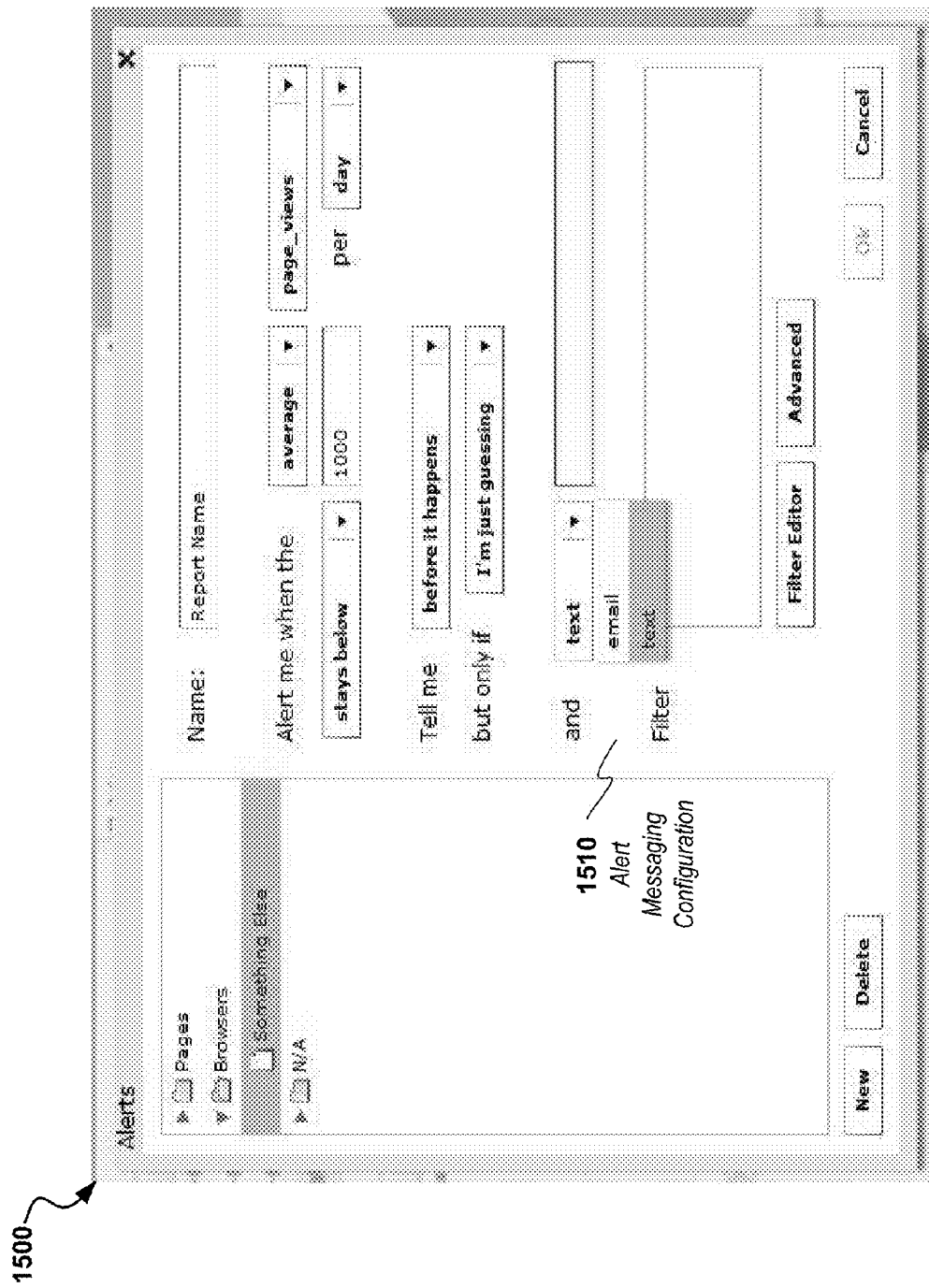
FIG. 15 illustrates a screenshot of aspects related to alert indication/messaging configuration in accordance with the disclosure.

FIG. 15 illustrates additional details of an exemplary screenshot 1500 and associated functions to configure alert messaging. A menu option such as box 1510 may be used to allow a user to select the format of the alert message, such as via text (e.g., SMS), email, voice, etc. Based on one or more selections, a user may be notified accordingly when the event occurs or the prediction of the event occurrence is made. Additional options may include menus to provide information such as phone numbers, email addresses, etc.

Figure 16:
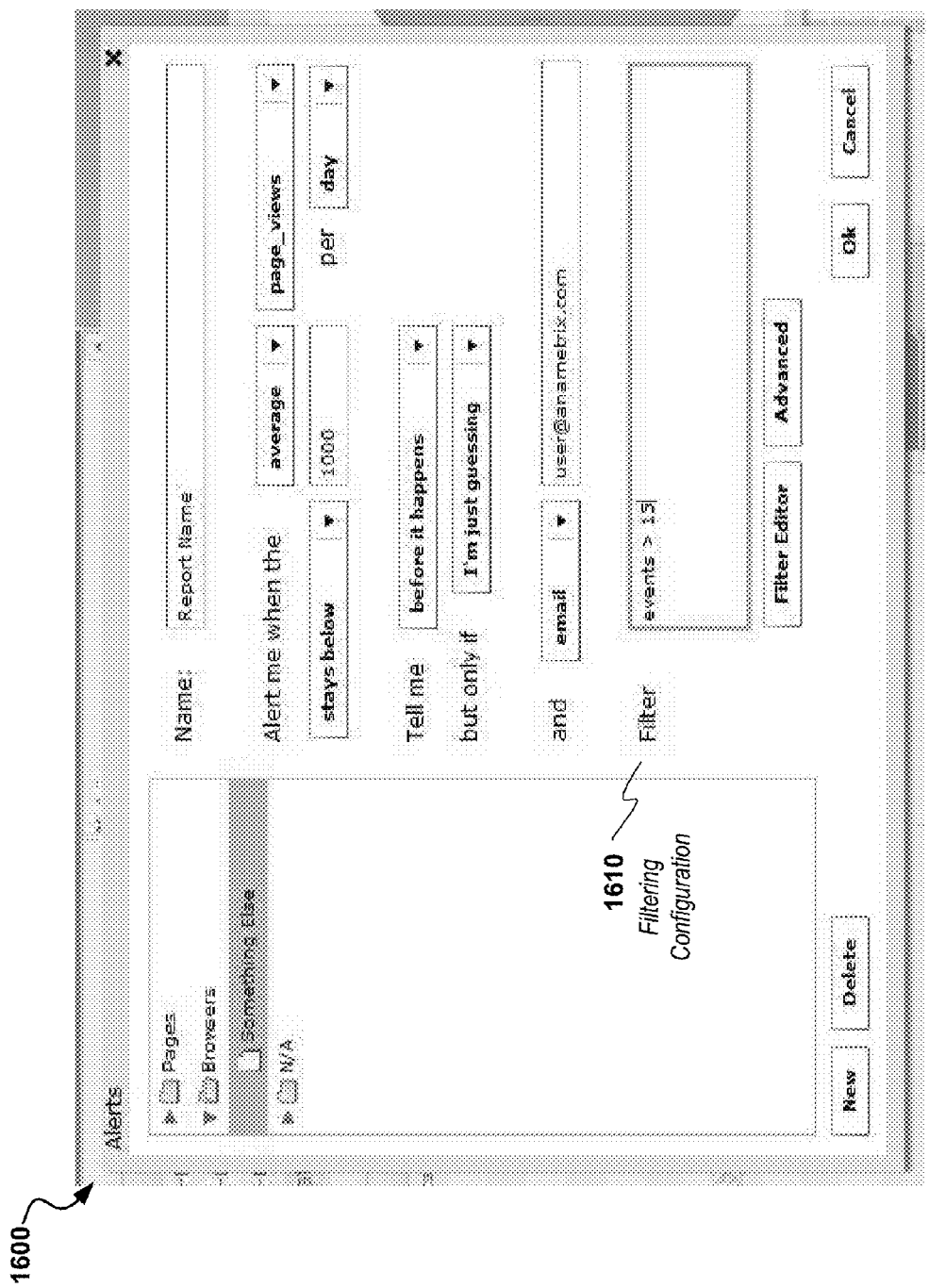
FIG. 16 illustrates a screenshot of aspects related to filtering configuration in accordance with the disclosure.

FIG. 16 illustrates additional details of an exemplary screenshot 1600 and associated functions to configure alert filtering. For example, box 1610 may be configured to allow a user to filter predictive results and/or related data or information. For example, formulas associated with one or more events may be defined, such as in the example shown where more than 15 events are required to generate an alert. Data may be screened in accordance with defined filtering criteria and alerts sent consistent with the defined filtering.

Figure 17:
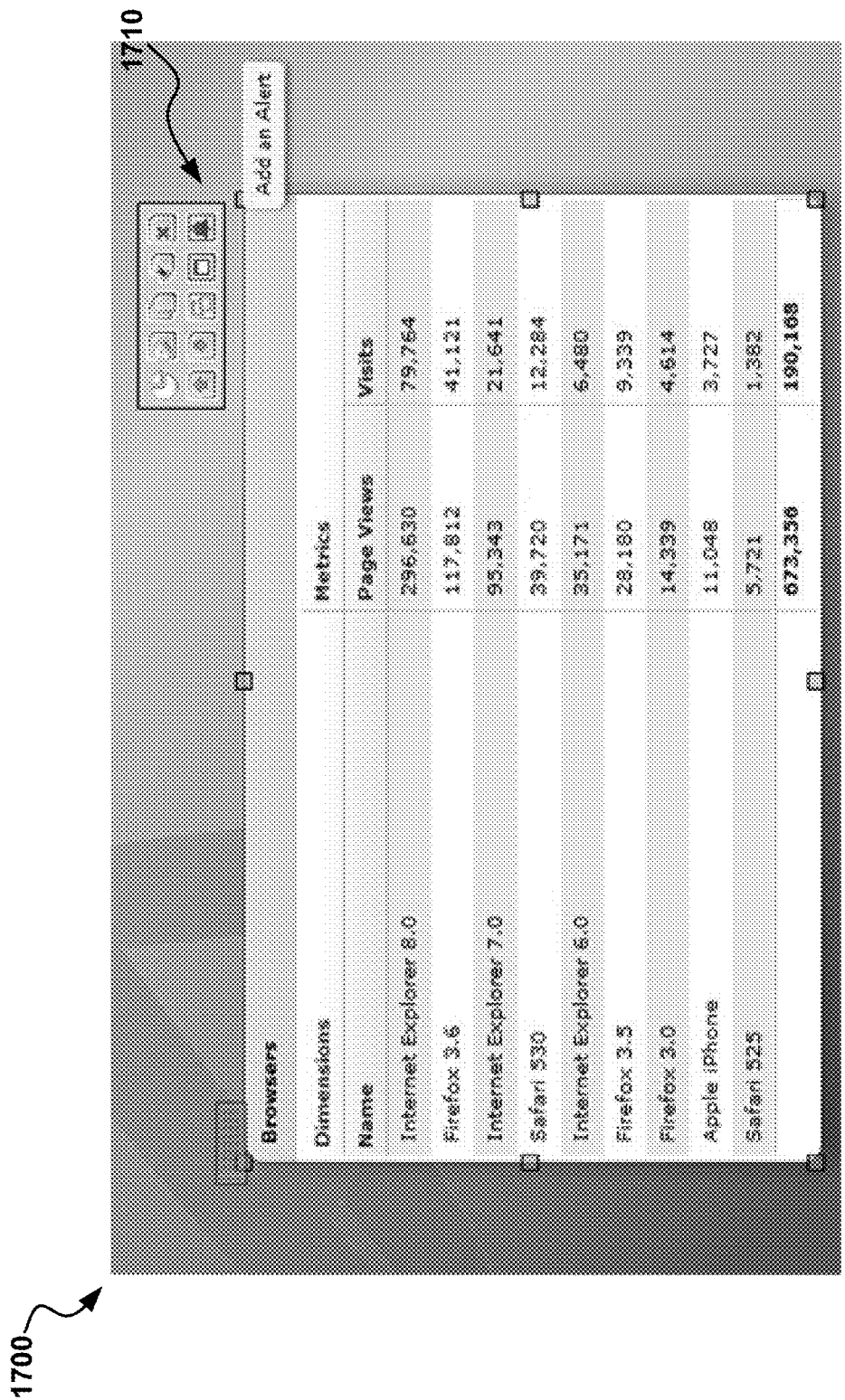
FIG. 17 illustrates a screenshot of aspects related to adding alerts to reports in accordance with the disclosure.

FIG. 17 illustrates details of an embodiment of a screenshot 1700 for generating reports with associated alert information. In this example, an alert may be added to a table in a report (such as defined in the Related Application) and the alert may be added by, for example, selecting an alert tab, button or other indicator 1710. In this example, the metrics include page views and website visits for each of a plurality of browser applications as well as a total value of each metric for all browser applications.

Figure 18:
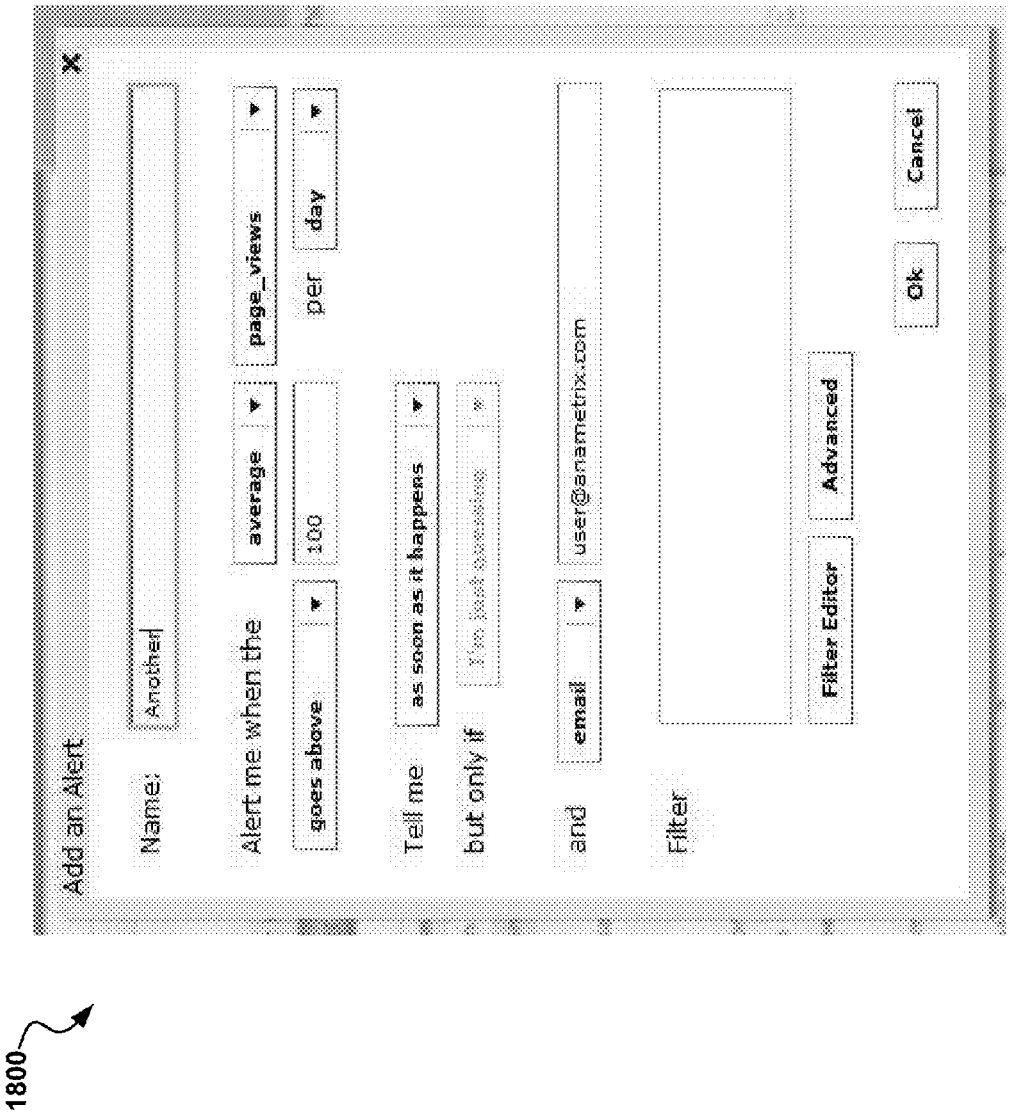
FIG. 18 illustrates a screenshot of aspects related to creating a new alert configuration in accordance with the disclosure.

FIG. 18 illustrates details of an embodiment of a screenshot 1800 for creating a new alert within a previously created table. Configuration options shown in screenshot 1800 are similar to those shown previously with respect to screenshots 700-1600 and may be similarly implemented.

Figure 19:
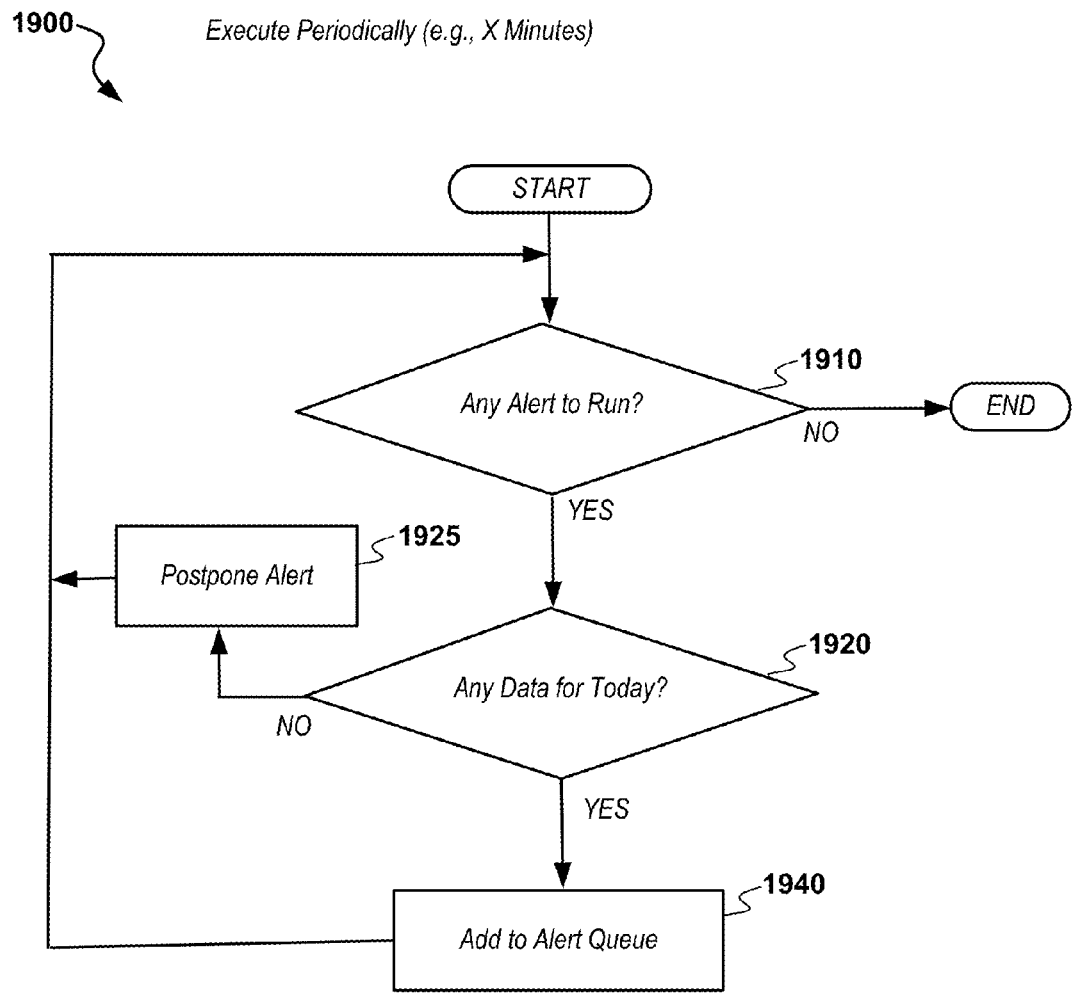
FIG. 19 illustrates details of an exemplary embodiment of a process for checking for alerts.

FIG. 19 illustrates details of an embodiment of a process 1900 for server processing of alerts and associated functionality. The thread illustrated in example process 1900 may be performed periodically, such as at a predefined time interval (e.g., every X minutes, etc.). At stage 1910, a database, which may reside in or be coupled to the server system 110, is checked for alerts that are to be processed/acted on. At stage 1920, a check is made regarding whether any recent or additional data has been received, which may be accounted for in prediction and/or alert generation. If it is determined at stage 1920 that new data has been received, it is added to an alert queue at stage 1940 and executed when the server system has available processing time. This function may be used to prevent system overloading. Subsequent to sending the alert (if appropriate), processing returns to stage 1910.

If it is determined that no new data has been received at stage 1920, alert provision is postponed at stage 1925 to a subsequent alert cycle. This may be conditional—for example, if the alert has been postponed multiple times (such as a predefined number of times, or based on processor loading, etc.) an alert may be sent and/or an alarm or other indication regarding postponement of the alert may be sent to a user and/or to an operation, administration, and management function (OA&M) associated with the server system 110.

Figure 20:
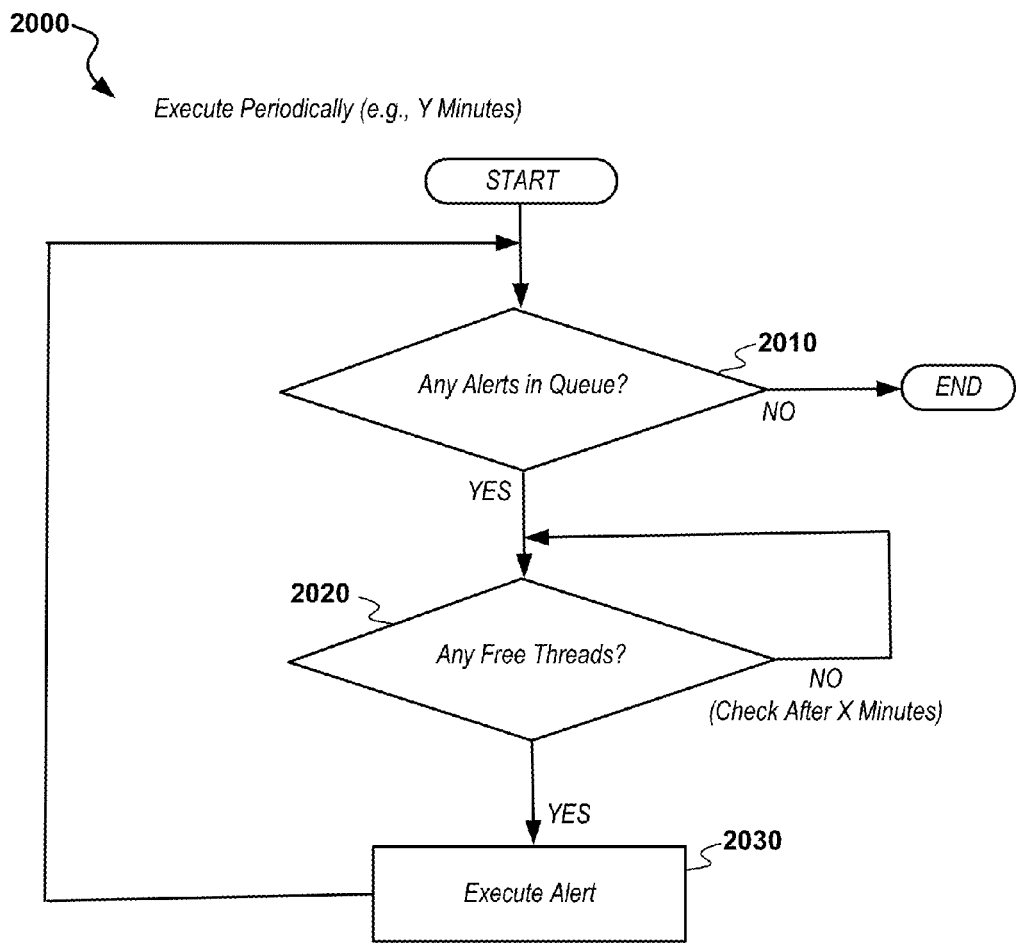
FIG. 20 illustrates details of an exemplary embodiment of a process for generating predictive alerting.

FIG. 20 illustrates details of an embodiment of a process 2000 for server processing of alerts and associated functionality, which may be performed in conjunction with process 1900. At stage 2010, a check is made to determine if any alerts are in the alert queue (e.g., corresponding to stage 1910 of FIG. 19). A thread pool may be used so that alerts may be executed at the same time, but in general there will be a limit to the number of threads that can be simultaneously executed. If, for example, all threads are occupied, processing may be delayed to wait for available free threads at stage 2020.

At stage 2030, the alert is executed using an available thread, such as described subsequently with respect to FIG. 21.

Figure 21:
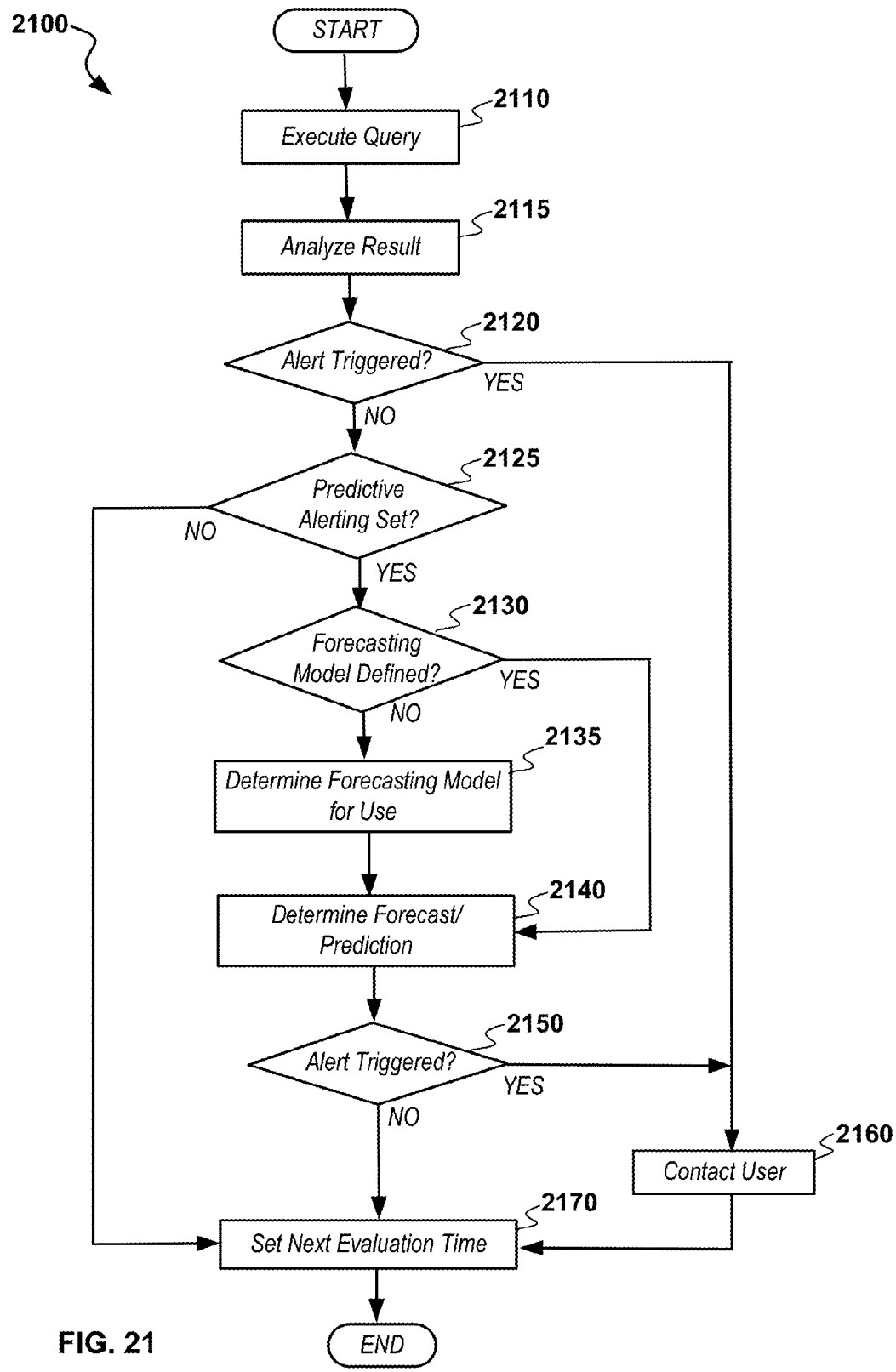
FIG. 21 illustrates details of an exemplary embodiment of a process for executing an alert.

FIG. 21 illustrates an embodiment of a process 2100 for executing an alert. The processing may be done in conjunction with processes 1900 and 2000. At stage 2110, a query is built up and sent to a query engine to retrieve current data. The query may be dynamically generated. At stage 2115, the query results may be analyzed. Depending on a particular rule being used (e.g., above a threshold, below, at, etc.) and the type of data (e.g., sum, min, max, average, etc.) analysis will be done in different ways. In any case, an alert triggering stage 2120 is used to determine if alert triggering conditions have been met. If they have, processing continues at stage 2160 where an alert is sent to the user.

Alternately, at stage 2125, a determination is made as to whether predictive alerting has been enabled. This may be set by a menu option, such as described previously, which may be further accompanied by rules/conditions/parameters such as described previously. If no predictive alerting has been enabled at stage 2125, processing proceeds to stage 2170 and the process 2100 is repeated at the next evaluation time. If it is determined at stage 2125 that predictive alerting is enabled, the process 2100 continues at stage 2130 where it is determined if a forecasting/prediction model has been defined. If it is determined at stage 2130 that a forecasting/prediction model has been defined, the process 2100 continues at stage 2140 where a forecast/prediction is made (such as described in more detail subsequently). If it is determined at stage 2130 that no prediction model has been defined, a model is determined at stage 2135. This prediction model may be based on, for example, old/previous data such as is described subsequently herein. The prediction model may also be based on criteria such as confidence desired by the user, availability of related data/models, and/or other criteria. In some cases, data or other models may be available, which may be based on similar or analogous processes and time series.

At stage 2140, a prediction is made based on received data and the prediction model. If it is determined at stage 2150 that the prediction is such that an alert is sent (e.g., the prediction matches an alerting criteria such as, for example, reporting within a certain number of hits of a target, at a predefined time interval, or based on other criteria), and processing proceeds to stage 2160, from which a predictive alert may be sent, such as via an email, text, voice message, etc. At stage 2170, subsequent evaluation timing may be determined. This may be based on a periodical evaluation, data or event driven evaluation, or other evaluation criteria. Consistent with the next evaluation time, process 2100 is then repeated. The evaluation timing may be configured so as to minimize loading on the server system, such as by processing data and generating alerts during non-peak times.

As an example of processing associated with stage 2170, subsequent evaluation timing may be generated as follows. For the sake of efficiency, depending on the data already collected, alert timing may be determined to be efficiently done. For example in some cases it may not be efficient to run the alert every single day, especially in the beginning of the alerting period. The following formula may be used to determine how many days of waiting should be used until a next alert is run (assuming the alert has been run for at least 5 subsequent days in this example).

In this example, C is the threshold value used during the given period of time. This may be the value specified in the alert definition (e.g., in the user interface as described previously with respect to screenshot 700).

$$n = \left[\frac{C - C_t}{S_t}\right] * p \quad (1)$$

where n is the number of days of waiting and p is a factor that determines how strict one should be when waiting certain number of days (0<p<1). For example, a smaller p means one will wait fewer days and will be stricter not to miss the actual value. $C_t$ is the sum of measured values up to and including the period t (t is 5 days in this example). In some cases one will use the sample of at least 5 measured (actual) values. $S_t$ is the exponential moving average calculated based on the measured values up to and including the period t (t>=5). A formula for exponential moving average $S_t$ is as follows:

$$S_t = \alpha * Y_t + (1-\alpha) * S_{t-1} \quad (2)$$

where $\alpha$ is the smoothing coefficient, $Y_t$ is the received data sample and $S_t$ is the exponentially smoothed data.

Figure 22:
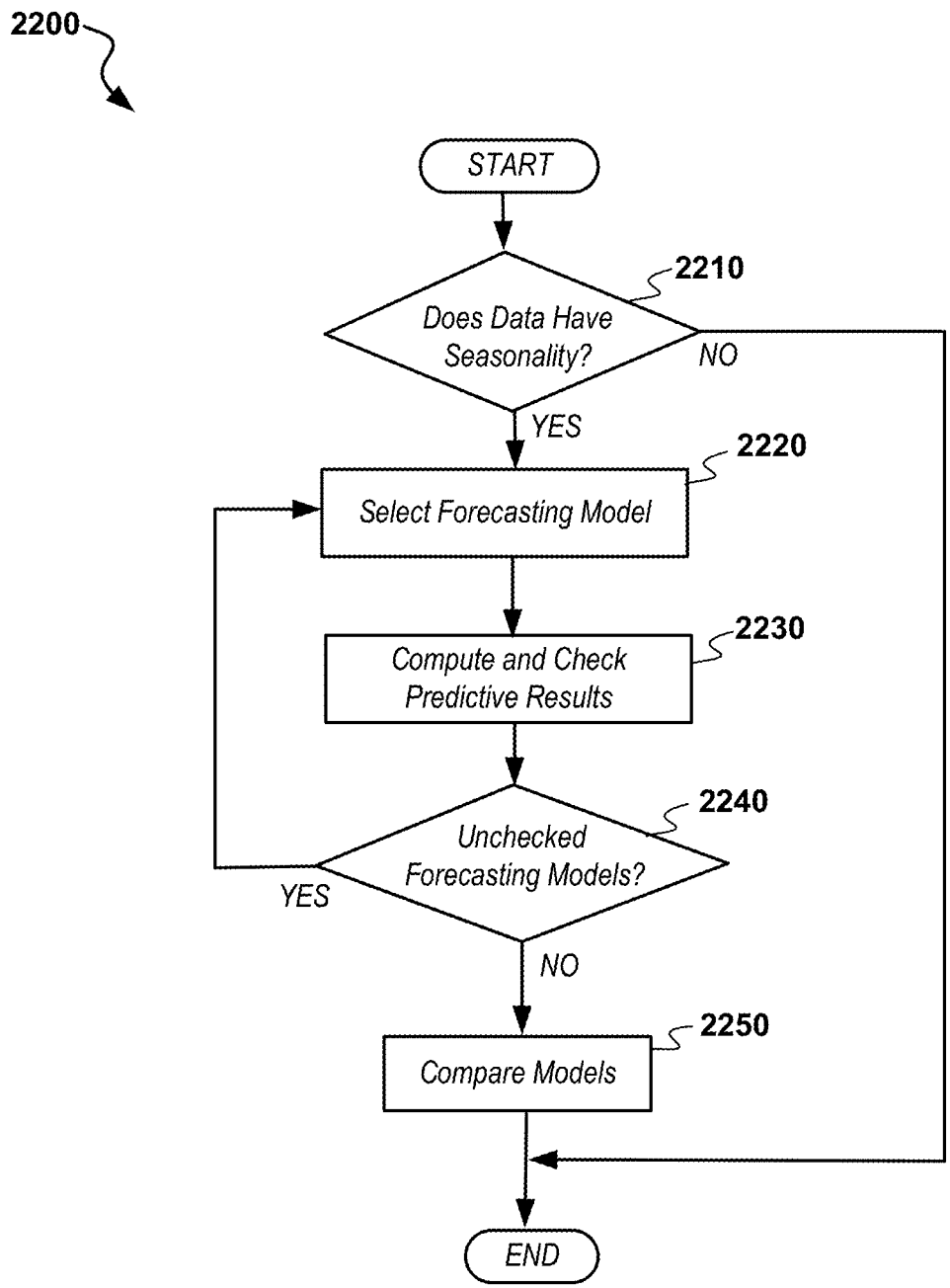
FIG. 22 illustrates details of an exemplary embodiment of a process for generating predictive alerting.

FIG. 22 illustrates details of an embodiment of a process 2200 for generating a prediction for use in predictive alerting. At stage 2210, data is checked for temporal (or other) characteristics, such as seasonality (in this example). At stage 2220, a predictive model is selected. This may be done as shown subsequently herein in conjunction with FIG. 24. At stage 2230, with a predictive model selected, the model may then be used with different parameters over different time periods to find a set of optimal parameters for the selected model. One example for triple exponential smoothing is described subsequently. An error metric, such as mean squared error (MSE) may be determined for the model for later comparison (e.g., at stage 2250). If multiple models are available or used, they may each be checked, such as by repeating the loop from stage 2240 back to stage 2220. At stage 2250, the models are compared and an optimal model or models may then be used to generate predictive alerts based on applying received data to the model.

Figure 23:
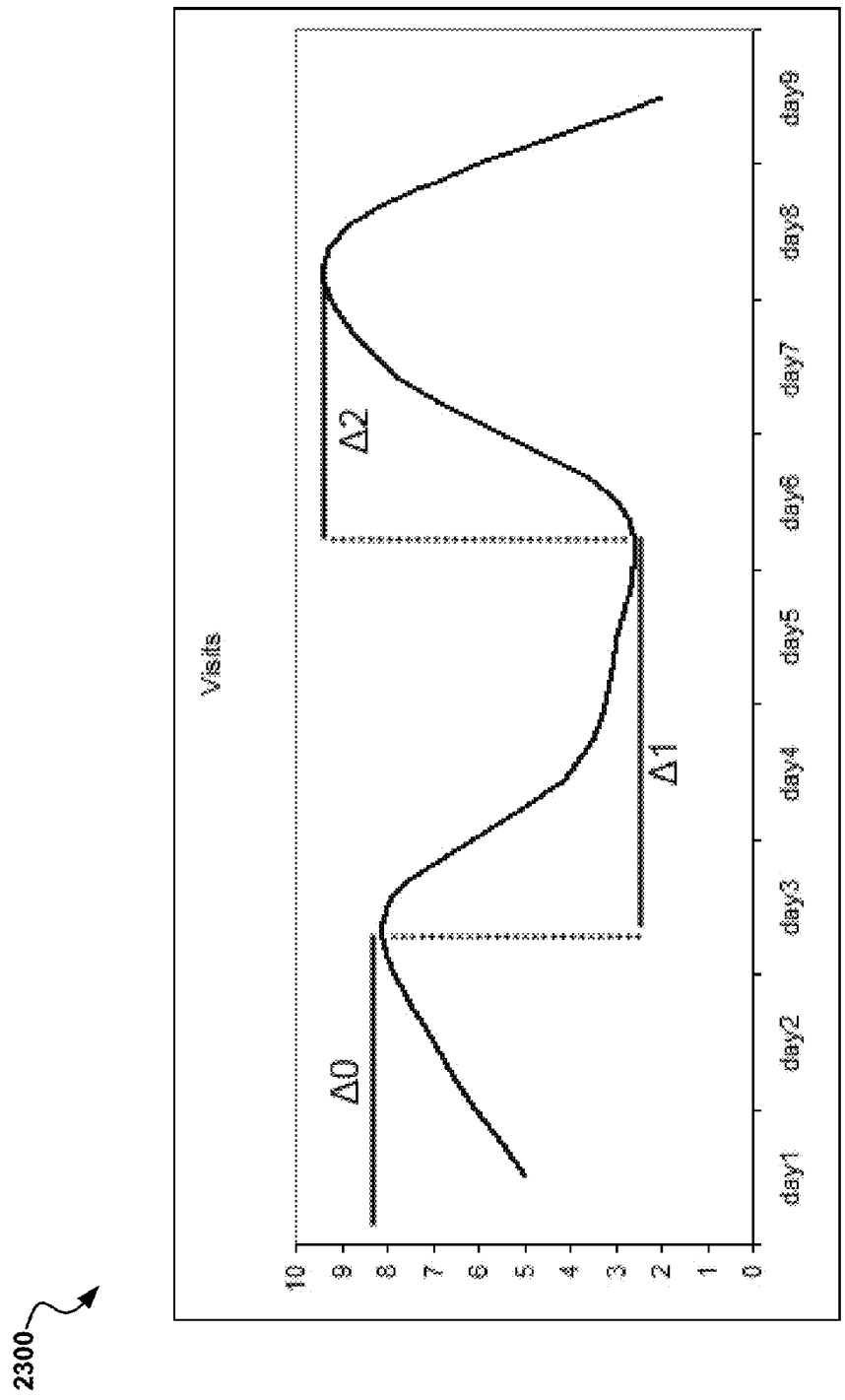
FIG. 23 illustrates an exemplary embodiment for generation of predictive alerting.

FIG. 23 illustrates details of an exemplary analysis of one type of temporal variability associated with seasonality.

In a first aspect, seasonality is represented by a number of times a trend changes over a certain period of time. In this aspect, seasonality may be determined using previously received data. For example, a mean of the time intervals between multiple time points where the trend has changed may be used.

One general formula to calculate the mean time interval between trend changes is as follows:

$$\overline{\Delta}_k = 1/n \Sigma \Delta_k \quad (3)$$

where n is the number of observed times that the trend has changed, $\Delta_k$ (k=0, 1, 2 in this example) is the time interval between two different data points at which the trend changed and $\overline{\Delta}_k$ is the mean time interval between trend changes. In the graph 2300 illustrated in FIG. 23, the $\Delta_k$ variable is representative of half a cycle where a full cycle is similar to a complete cycle of a sin wave.

The example shown in FIG. 23, in graph 2300, utilizes a moving average convergence/divergence (MACD) indicator. The MACD may be based on, for example, two exponential moving averages, one over a longer period of time and another one over a shorter period.

For example, MACD=EMA(short)−EMA (long), where EMA(short) is a shorter exponential moving average and EMA(long) is a longer exponential moving average as determined by values of the smoothing coefficient $\alpha$. The number of data points used to calculate either EMA may be set to a predefined or arbitrary value.

The signal indicator may be the exponential moving average of itself (for some arbitrary number of data points).

In certain embodiments it may be desired to determine the number of times that the signal indicator experiences a seasonal change over a given period of time (e.g., the number of times the trend of the signal changes over the given period). In one embodiment the trend of the signal is deemed to change at each data point at which the slope of the signal changes from negative to positive, or vice-versa. Having determined such trend changes, an optimal model for forecasting may be selected (as discussed above).

For example, assume a user sets an alert for one month and uses predictive alerting. The data for previous months may be used to compute cyclical characteristics such as, for example: the average number of times the trend changed per month; and the average interval length between two different data points at which the trend changed. In the present example it is further assumed that historical data is available for three (3) months. Based upon this historical data, the trend was determined to change four (4) times during the first month, five (5) times during the second month, and three (3) times during the third month. Accordingly, in this example the average interval length between trend changes is approximately 6.4 days over the historical three-month period; that is, the trend changes roughly once per week.

In addition, the data for each of the individual weeks within the period may be evaluated to determine if multiple trend changes occur during any of the weeks. If not, a model based upon monthly seasonality may be utilized.

In various embodiments seasonality may be further analyzed using an autocorrelation function. For example, the autocorrelation function may be used to determine whether the data is random. If the data is determined not to be random, the autocorrelation function is next used to determine the number of lags in the data. In an exemplary embodiment a lag is defined as a local maximum in the autocorrelation function and is therefore similar to completion of two changes in trend discussed above (completion of a full cycle or one period of a sin wave).

If, on the other hand, the data is determined to be random, a simple moving average is used for the forecasting/prediction.

When the data is determined to be non-random, the average period before each change in trend is determined in the following manner. First, lags are calculated using an autocorrelation function for each lag. A lag is defined as follows. Given measurements $Y_1, Y_2, \ldots, Y_N$ the lag k autocorrelation function "$r_k$" is defined as:

$$r_k = \frac{\sum_{i=1}^{N-k}(Y_i - \overline{Y})(Y_{i+k} - \overline{Y})}{\sum_{i=1}^{N}(Y_i - \overline{Y})^2} \quad (4)$$

where $\overline{Y}$ is the average or mean value of the measurements $Y_1, Y_2, \ldots, Y_N$. If $r_k$ for the first three lags (k=1, 2, 3) is greater than 0.5, in one example, the data can be determined to be non-random. Otherwise the data is determined to be random. When the data is determined to be random, in one aspect, a simple moving average can be used to determine an average change per data point based on a previous set of data points (e.g., 28 data points). Based on the moving average, it can be estimated how big a change would be expected for "n" data points in the future assuming that there is no non-random trend determined in the future.

For each lag k=1 ... N−1 those lags that meet the following criteria are identified:

$$r_i > r_{i-1}, r_{i-2} \ldots r_{i-5} \text{ and } r_i > r_{i+1}, r_{i+2} \ldots r_{i+5} \quad (5)$$

In this case, the autocorrelation variable $r_i$, for a middle lag value "i" is compared to five lag values on either side of the middle lag value i. The signal Y can be sampled every second, minute, day, week, month, or whatever time length is of interest or fits the seasonality of the signal (e.g., seasonality varies throughout the day, week, month, etc.). Lags that satisfy relationship (5) are classified as local maximums. All local maximums in a given seasonality period are identified and an average lag value indicative of a cyclical characteristic for the seasonality period is calculated (e.g., average time between local maximums to calculate the number of full cycles or periods "L" in one or more seasonality time frames). In another aspect, local minimums of the autocorrelation function at different lag values k could also be used. The time interval between trend changes discussed above is similar to half a cycle as indicated by the distance between local maximums of the autocorrelation function $r_k$.

Figure 24:
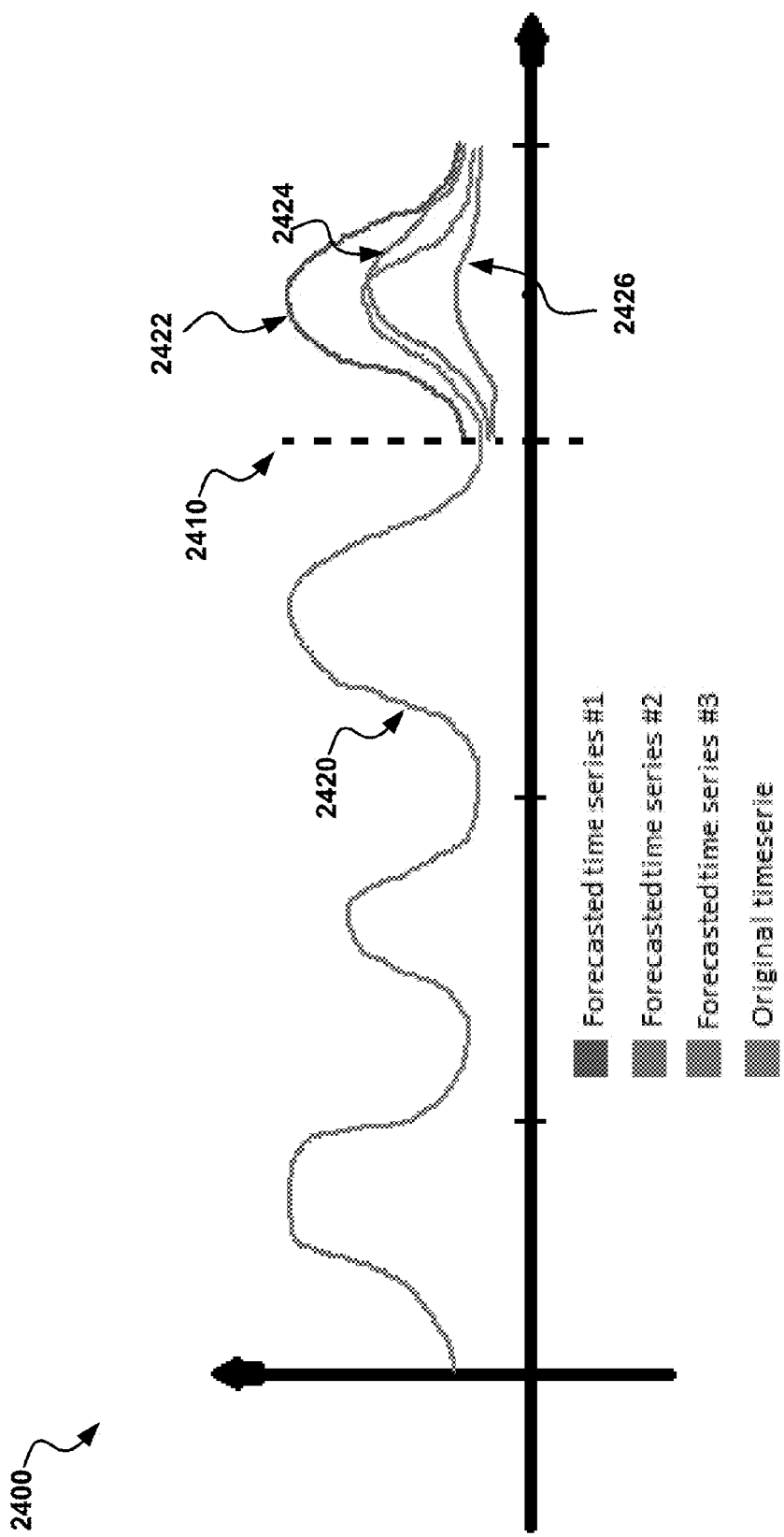
FIG. 24 illustrates an exemplary embodiment for prediction model determination for use in generating alert messages.

FIG. 24 illustrates details of an example of alert processing using triple exponential smoothing. In this example, previously received and stored data may be used to determine one or more models for use in the prediction. In one example, a single optimal model may be determined.

A triple exponential smoothing model may be used when the data shows seasonality and trend. To use this model, in one example, at least two seasonal time periods of old/previous data are received and stored. With more than two seasonal time periods of old/previous data, the results may be improved (e.g., by improving stability, etc.). Example forecasting algorithms are shown below:

Overall Smoothing Algorithm:

$$S_t = \alpha(Y_t - I_{t-L}) + (1-\alpha)(S_{t-1} + b_{t-1}), 0 < \alpha < 1 \quad (6)$$

Trend Smoothing Algorithm:

$$b_t = \gamma(S_t - S_{t-1}) + (1-\gamma)b_{t-1}, 0 < \gamma < 1 \quad (7)$$

Seasonal Smoothing Algorithm:

$$I_t = \beta(Y_t - S_t) + (1-\beta)I_{t-L}, 0 < \beta < 1 \quad (8)$$

Predictive Forecast:

$$F_{t+m} = S_t + mb_t + I_{t-L+m} \quad (9)$$

Where: Y is the observed value, S is the smoothed value, b is the trend factor, I is the seasonal index, F is the forecasted value, L is the average lag value between local maximums or an average time for the trend to change twice (as discussed above), and m is the number of data points in the future for which the predictive forecast is being made. When selecting α, γ, and β for this model, old/previous data may be used to make a forecast over one or more whole periods with proposed parameters. An example of this is shown in FIG. 24. An original time series (defined by the old/previous data) shown in a first time series 2420 is shown to the left of line 2410, with multiple forecast time series 2422, 2424, and 2426 shown along with the first time series 2420 to the right of line 2410. In this example, time series 2424 may have a minimal error metric, such as, for example, a minimum Mean Squared Error (MSE) compared to the first time series 2420. This model may then be used as the predictive model for future prediction generations and alerts. The generation process may be repeated periodically and/or asynchronously to update the predictive model.

Figure 25:
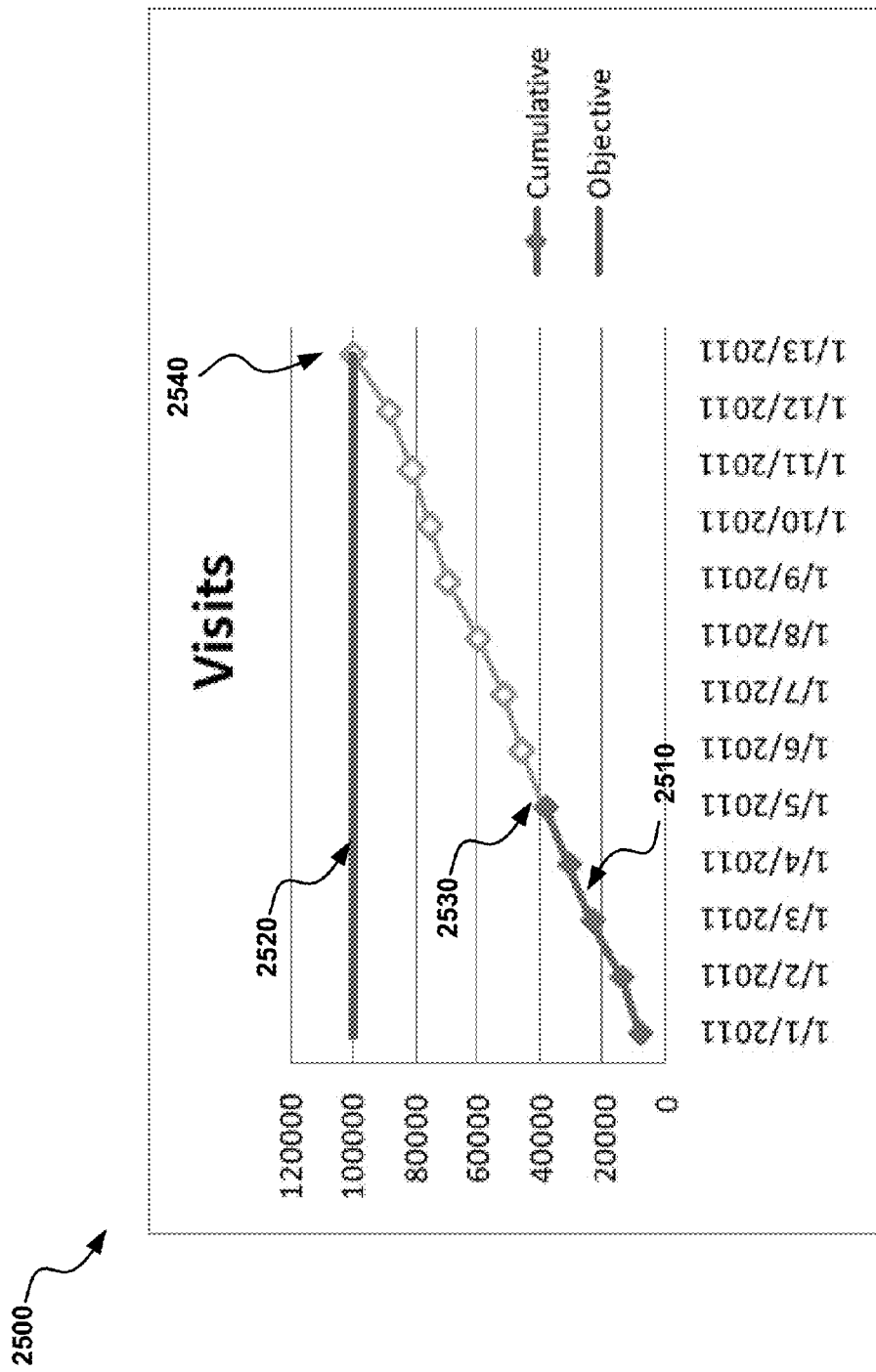
FIG. 25 illustrates an exemplary predictive alert message that may be provided from an alerting system.

FIG. 25 illustrates a simplified example display 2500 of information that may be provided to a user as a predictive alert. In this example, objective data, as shown in graph 2520, may be used to determine a threshold for alerting. Cumulative data, as shown in graph 2510, may be received at a server system and provided to a predictive model, such as described previously herein. The predictive model may then generate, based on the information defining the model and the received data, a prediction as to when the received data will reach the threshold. For example, data may be received by the server system up to point 2530, and the model may then determine when the cumulative value will reach point 2520 (e.g., reach the threshold value at point 2540). Based on this information, an alert containing information, such as shown in FIG. 25, may be sent to a user informing the user of the prediction and associated data values, dates, etc. The alert may be, for example, an email or other message. Information may include, for example, a date when the variable (in this case Visits to a webpage) will reach a threshold (e.g., 100,000).

Figure 26:
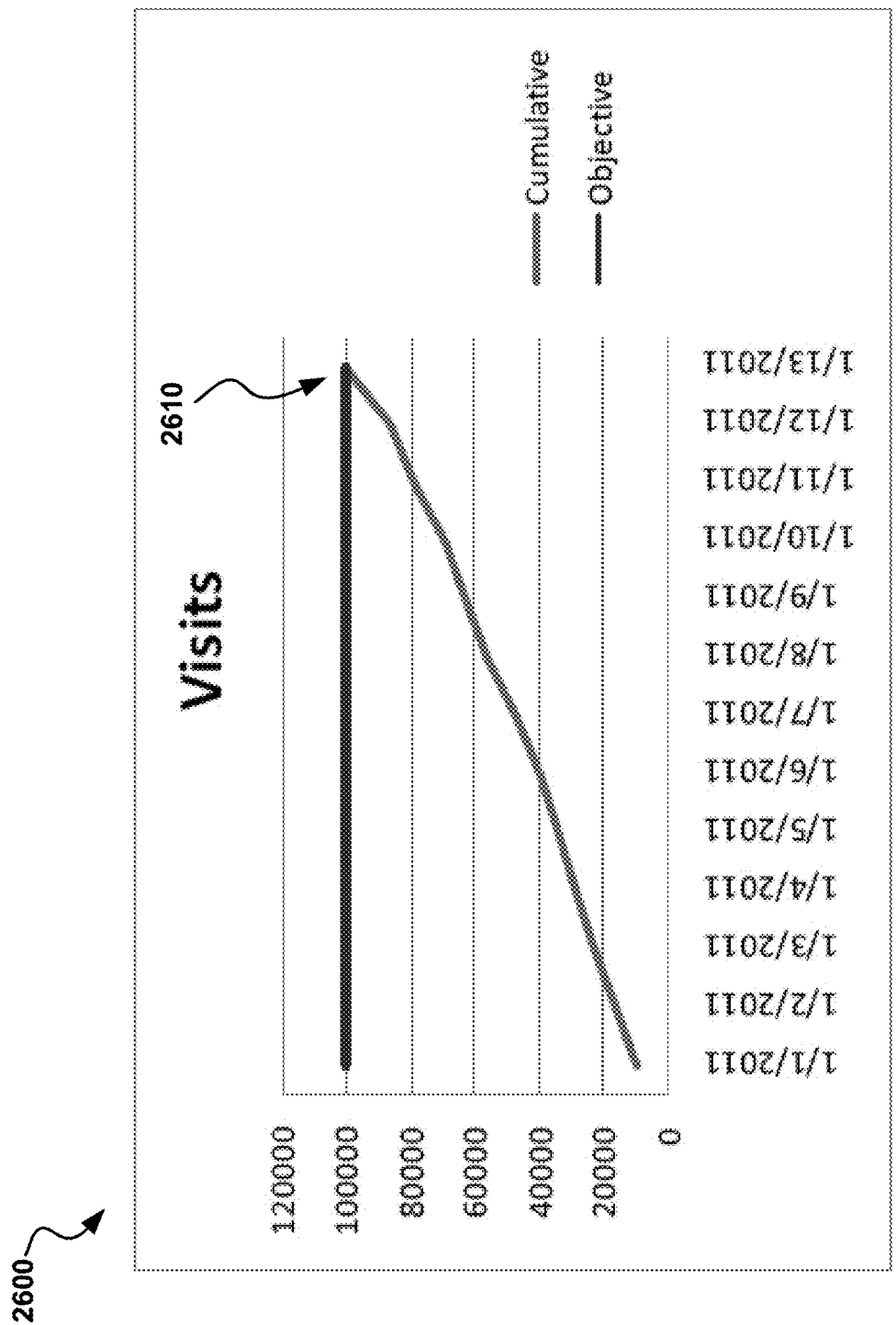
FIG. 26 illustrates an exemplary alert message that may be provided from an alerting system.

FIG. 26 illustrates a simplified example display 2600 of information that may be provided to a user in response to satisfaction of a predefined condition or event. For example, the information shown in FIG. 26 may be provided to a user upon the date the variable (e.g., Visits) actually reaches the defined threshold (e.g., 100,000) at point 2610.

In some configurations, the systems and apparatus described herein include means for performing various functions as described herein. In one aspect, the aforementioned means may be a processor or processors and associated memory in which embodiments reside, and which are configured to perform the functions recited by the aforementioned means. The aforementioned means may be, for example, processor and/or memory modules or apparatus residing in modems to perform the functions described herein. In another aspect, the aforementioned means may be a module or apparatus configured to perform the functions recited by the aforementioned means, such as an application program and/or plug-in to an application program.

In one or more exemplary embodiments, the functions, methods and processes described may be implemented in hardware, software, firmware, or any combination thereof. If implemented in software, the functions may be stored on or encoded as one or more instructions or code on a computer-readable medium. The software may include an application program and/or a plug-in for use with an application program. The application program may be, for example, a spreadsheet such as Microsoft Excel.

Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above can also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The illustrated processes present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The scope of the invention is not intended to be limited to the aspects shown herein, but is to be accorded the full scope consistent with the description herein, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein.

What is claimed is:

1. A method of providing predictive alerting, comprising:
   receiving, by a computing device, web analytics data associated with one or more variables related to a web site, wherein the one or more variables related to the web site are indicative of one or more of results of an advertising campaign, a number of hits, and inventory information;
   analyzing, by a computing device, the web analytics data to identify a seasonality pattern associated with the one or more variables related to the web site;
   determining, using an autocorrelation function, a cyclical characteristic of the seasonality pattern;
   determining one or more predictive models associated with the one or more variables related to the web site, the determining being based on the web analytics data associated with the one or more variables related to the web site;
   receiving additional data associated with the one or more variables related to the web site; and
   providing, based on the additional data and the one or more predictive models, an alert indicative of a predicted future state of the one or more variables related to the web site.

2. The method of claim 1, wherein the providing includes sending the alert as an email message.

3. The method of claim 1, wherein the providing includes providing the alert as a text message or a voice message.

4. The method of claim 1, wherein the providing includes posting the alert on a website.

5. The method of claim 1, wherein the one or more predictive models are based on a temporal variation in the one or more variables.

6. The method of claim 5, wherein the temporal variation is a seasonal variation.

7. The method of claim 1, wherein the one or more predictive models are based on an event associated with the one or more variables.

8. The method of claim 1, comprising:
receiving user-supplied configuration parameters associated with the alert.

9. The method of claim 8, wherein the user-supplied configuration parameters relate to a temporal configuration associated with the alert.

10. The method of claim 8, wherein the user-supplied configuration parameters relate to a prediction configuration associated with the alert.

11. The method of claim 8, wherein the user-supplied configuration parameters relate to a confidence configuration associated with the alert.

12. The method of claim 1, comprising:
determining that the web analytics data exhibits randomness,
wherein the determining the one or more predictive models is based on the web analytics data exhibiting randomness.

13. The method of claim 1, comprising:
determining, using the autocorrelation function, a number of lags in the web analytics data.

14. The method of claim 1, wherein the cyclical characteristic of the seasonality pattern comprises one of an average number of times the seasonality pattern changes over a period of time and an average interval length between two different data points at which the seasonality pattern changes.

15. The method of claim 1, comprising:
determining, using the autocorrelation function, whether the web analytics data is random.

16. The method of claim 1, comprising:
determining a confidence of the predicted future state of the one or more variables related to the web site; and
determining whether the confidence of the predicted future state of the one or more variables is greater than or equal to a defined confidence level,
wherein the alert is provided based on the confidence of the predicted future state of the one or more variables being greater than or equal to the defined confidence level.

17. The method of claim 1, comprising:
determining a predicted time that the predicted future state of the one or more variables related to the web site will occur,
wherein the alert includes the predicted time.

18. The method of claim 1, comprising:
determining a non-peak window of time of use of the computing device;
receiving a selection of at least one of the variables related to the web site, wherein analyzing the web analytics data to identify the seasonality pattern is performed using the selected at least one of the variables related to the web site;
determining an average period of time before each change in trend in the cyclical characteristic of the seasonality pattern;
determining, during the non-peak window of time, based on the average period of time before each change in trend in the cyclical characteristic of the seasonality pattern, a predicted time that the predicted future state of the one or more variables related to the web site will occur; and
sending the alert indicative of the predicted future state of the one or more variables related to the web site, wherein the alert includes the predicted time.

19. Non-transitory computer-readable media storing instructions that, when executed by a processor, cause a system to:
receive web analytics data associated with one or more variables related to a web site, wherein the one or more variables related to the web site are indicative of one or more of results of an advertising campaign, a number of hits, and inventory information;
analyze the web analytics data to identify a seasonality pattern associated with the one or more variables related to the web site;
determine, using an autocorrelation function, a cyclical characteristic of the seasonality pattern;
determine one or more predictive models associated with the one or more variables related to the web site, the determining being based on the web analytics data associated with the one or more variables related to the web site;
receive additional data associated with the one or more variables related to the web site; and
provide, based on the additional data and the one or more predictive models, an alert indicative of a predicted future state of the one or more variables related to the web site.

20. The non-transitory computer-readable media of claim 19, storing instructions that, when executed by the processor, cause the system to:
send the alert as an email message.

21. The non-transitory computer-readable media of claim 19, storing instructions that, when executed by the processor, cause the system to:
provide the alert as a text message or a voice message.

22. The non-transitory computer-readable media of claim 19, storing instructions that, when executed by the processor, cause the system to:
provide the alert on a website.

23. The non-transitory computer-readable media of claim 19, wherein the one or more predictive models are based on a temporal variation in the one or more variables.

24. The non-transitory computer-readable media of claim 23, wherein the temporal variation is a seasonal variation.

25. The non-transitory computer-readable media of claim 19, wherein the one or more predictive models are based on an event associated with the one or more variables.

26. The non-transitory computer-readable media of claim 19, storing instructions that, when executed by the processor, cause the system to:
receive configuration parameters associated with the alert.

27. The non-transitory computer-readable media of claim 26, wherein the configuration parameters relate to a temporal configuration associated with the alert.

28. The non-transitory computer-readable media of claim 26, wherein the configuration parameters relate to a prediction configuration associated with the alert.

29. The non-transitory computer-readable media of claim 26, wherein the configuration parameters relate to a confidence configuration associated with the alert.

30. The non-transitory computer-readable media of claim 26, storing instructions that, when executed by the processor, cause the system to:
determine that the web analytics data exhibits randomness,
wherein determining the one or more predictive models is based on the web analytics data exhibiting randomness.

31. The non-transitory computer-readable media of claim 19, wherein the instructions, when executed by the processor, cause the system to:
determine a non-peak window of time of use of the system;
receive a selection of at least one of the variables related to the web site, wherein analyzing the web analytics data to identify the seasonality pattern is performed using the selected at least one of the variables related to the web site;

determine an average period of time before each change in trend in the cyclical characteristic of the seasonality pattern;

determine, using the at least one processor during the non-peak window of time, based on the average period of time before each change in trend in the cyclical characteristic of the seasonality pattern, a predicted time that the predicted future state of the one or more variables related to the web site will occur; and send the alert indicative of the predicted future state of the one or more variables related to the web site, wherein the alert includes the predicted time.

32. A system, comprising:

at least one processor; and a memory storing instructions that, when executed by the at least one processor, cause the system to:

receive web analytics data associated with one or more variables related to a web site, wherein the one or more variables related to the web site are indicative of one or more of results of an advertising campaign, a number of hits, and inventory information;

analyze the web analytics data to identify a seasonality pattern associated with the one or more variables related to the web site;

determine, using an autocorrelation function, a cyclical characteristic of the seasonality pattern;

determine one or more predictive models associated with the one or more variables related to the web site, the determining being based on the web analytic data associated with the one or more variables related to the web site;

receive additional data associated with the one or more variables related to the web site; and generate, based on the additional data and the one or more predictive models, an alert indicative of a predicted future state of the one or more variables related to the web site.

33. The system of claim 32, wherein the instructions, when executed by the at least one processor, cause the system to:

determine a non-peak window of time of use of the system;

receive a selection of at least one of the variables related to the web site, wherein analyzing the web analytics data to identify the seasonality pattern is performed using the selected at least one of the variables related to the web site;

determine an average period of time before each change in trend in the cyclical characteristic of the seasonality pattern;

determine, using the at least one processor during the non-peak window of time, based on the average period of time before each change in trend in the cyclical characteristic of the seasonality pattern, a predicted time that the predicted future state of the one or more variables related to the web site will occur; and send the alert indicative of the predicted future state of the one or more variables related to the web site, wherein the alert includes the predicted time.

\* \* \* \* \*